(12) United States Patent
Hopkins

(10) Patent No.: US 9,448,856 B2
(45) Date of Patent: Sep. 20, 2016

(54) LOCK-FREE DUAL QUEUE WITH CONDITION SYNCHRONIZATION AND TIME-OUTS

(75) Inventor: William E. Hopkins, Brighton, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 1948 days.

(21) Appl. No.: 11/618,814

(22) Filed: Dec. 30, 2006

(65) Prior Publication Data
US 2007/0169123 A1    Jul. 19, 2007

Related U.S. Application Data

(63) Continuation-in-part of application No. 11/323,442, filed on Dec. 30, 2005, now Pat. No. 7,962,923.

(60) Provisional application No. 60/832,165, filed on Jul. 20, 2006.

(51) Int. Cl.
*G06F 9/46* (2006.01)
*G06F 9/52* (2006.01)

(52) U.S. Cl.
CPC ............. *G06F 9/52* (2013.01); *G06F 9/526* (2013.01)

(58) Field of Classification Search
None
See application file for complete search history.

(56) References Cited

U.S. PATENT DOCUMENTS

| | | | |
|---|---|---|---|
| 4,980,852 A * | 12/1990 | Giroir et al. | 709/213 |
| 5,671,446 A * | 9/1997 | Rakity et al. | 710/54 |
| 5,706,515 A | 1/1998 | Connelly et al. | |
| 5,812,824 A * | 9/1998 | Dearth | G06F 17/5022 370/411 |
| 6,615,216 B1 * | 9/2003 | Hu | |
| 6,651,146 B1 | 11/2003 | Srinivas et al. | |
| 6,826,757 B2 | 11/2004 | Steele, Jr. et al. | |
| 7,117,502 B1 | 10/2006 | Harris | |
| 7,293,143 B1 | 11/2007 | Shavit et al. | |
| 7,389,291 B1 * | 6/2008 | Shavit et al. | |

OTHER PUBLICATIONS

Parlante, Nick, "Linked List Basics", Stanford CS Education Library 2001, 1•25.
Herlihy, Maurice P., "A Methodology for Implementing Highly Concurrent Data Objects," Oct. 2, 1991, 34 pages, ACM Transactions on Programming Languages and Systems.
Michael, Maged M., "High Performance Dynamic Lock-Free Hash-Tables and List-Based Sets," Aug. 2002, pp. 1-10, Proc. 14th Annual ACM Symposium Parallel Algorithms and Architectures.
Michael, Maged M., "Hazard Pointers: Safe Memory Reclamation for Lock-Free Objects," Jun. 2004, pp. 491-504, IEEE Transactions on Parallel and Distributed Systems, vol. 15, No. 6.

(Continued)

*Primary Examiner* — Gregory A Kessler

(57) ABSTRACT

Systems and methods for operating software data structures are provided. In one embodiment, lock-free dual queues with conditional synchronization and time-outs are described. The lock-free dual queues of various embodiments of the present invention are accessible by one or more consumer threads and one or more producing threads. The consuming threads are able to access and remove elements from the queue while the producing threads are able to access and add elements to the queue. In some cases, a thread may be both a consuming thread and a producing thread. The add and remove operations of various embodiments of the present invention, generally operate by using conditional synchronization primitives which modifies a value in shared memory to a specified value if the previous value is what was expected.

10 Claims, 18 Drawing Sheets

(56) References Cited

OTHER PUBLICATIONS

Michael, Maged M., "Scalable Lock-Free Dynamic Memory Allocation," Jun. 2004, pp. 1-12, The 2004 ACM SIGPLAN Conference on Programming Language Design and Implementation.

Michael, Maged M. and Scott, Michael L., "Simple, Fast, and Practical Non-blocking and Blocking Concurrent Queue Algorithms," May 1996, 9 pages, Proc. 15th Annual ACM Symposium Principles of Distributed Computing.

Scherer III, William N. and Scott, Michael L., "Nonblocking Concurrent Data Structures with Condition Synchronization," Oct. 2004, 15 pages, 18th Annual Conference on Distributed Computing.

Maged, Michael M., "CAS-Based Lock-Free Algorithm for Shared Deques," Aug. 2003, pp. 1-10, Proceedings of Ninth Euro-Par Conference Parallel Processing.

* cited by examiner

LOCK-FREE DUAL QUEUE WITH CONDITION SYNCHRONIZATION AND TIME-OUTS

CROSS-REFERENCE TO RELATED APPLICATIONS

This is a continuation-in-part of U.S. patent application Ser. No. 11/323,442, filed on Dec. 30, 2005 which is still pending. This application also claims the benefit of Provisional Application No. 60/832,165, filed on Jul. 20, 2006. Both of these applications are hereby incorporated by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2005-2006 Level 3 Communications, Inc.

TECHNICAL FIELD

Various embodiments of the present invention generally relate to systems and method for employing software data structures. More specifically, embodiments of the present invention relate to lock-free dual queues with conditional synchronization and time-outs.

BACKGROUND

In software, data structures called queues are frequently used to temporarily hold data for use by software threads. With multiple threads operating on a single queue at the same time, there can be multiple operations executing simultaneously. Multiple operations executing simultaneously on a single queue will generally lead to errors in modifying the queue state because one thread will read the state and begin modifying it while another thread changes the queue state to something incompatible with what the first thread is going to write back. This problem occurs because it is generally assumed in the implementation of operations that nothing else is modifying the queue while the operation is executing, i.e., operations execute atomically.

The result is that the threads all "take turns" executing operations on a shared queue, i.e., access from multiple threads is serialized. This discipline of access is enforced in the operations by using mutual exclusion locks ("mutexes") that block all threads but one from executing an operation. When a thread is done executing an operation, the next thread waiting is then allowed to execute.

This is not a problem when the threads are all executing on a single processor (except perhaps for the extra overhead incurred from the mutex implementation) since only one thread can execute at a time. However, when the process is executing on a multiprocessor system, this serialization of operation execution reduces the gain in throughput that would have otherwise occurred by having the threads executing on the multiple processors simultaneously.

The problem is further exacerbated in that it is possible for a thread to acquire a mutex and then be preempted by the operating system scheduler before the thread releases the mutex. This type of preemption blocks all other threads that need to execute a queue operation until the preempted thread resumes execution and releases the mutex.

The use of conventional lock-free algorithms may also introduce issues that arise in the design of lock-free algorithms that are not normally encountered with other algorithms. One is known as the ABA problem, which is when an instruction can't make the distinction between the memory location having never been changed and being changed but then being changed back to the expected value. Assumptions associated with the expected value can change. A common approach to eliminating the ABA problem is to attach an update counter to the memory location being updated. The counter is incremented each update, so even if the same value is assigned to the location, the update counter will be different.

Another problem associated with conventional lock-free designs is memory reclamation. Given that multiple threads can be executing operations simultaneously, even though one thread has determined that a shared object is no longer needed, it is sometimes difficult to be certain that no other thread is attempting to access that shared object. Returning the object to the memory allocator could result in runtime errors if other threads are attempting to access the object.

As such, there are a number of challenges and inefficiencies created in traditional systems that have multiple threads operating on a single queue at the same time. For example, multiple threads sharing a single queue are unable to concurrently access the queue. Thus, it can be difficult to adequately utilize all of the resources available. It is with respect to these and other problems that embodiments of the present invention have been made.

SUMMARY

Systems and methods are described for employing software data structures. Some embodiments of the present invention relate to lock-free dual queues with conditional synchronization and time-outs.

In some embodiments, a system comprising a memory and a microprocessor may be used to create a queue. The memory may be logically partitioned into one or more memory areas. Each memory area may be configured to store a node, wherein each node may include a next field referring to a logically subsequent node. In some embodiments, one of the one or more nodes is a first node and one of the one or more nodes is a last node. One of the one or more nodes may be accessible by a consumer thread and/or a producer thread. The microprocessor may execute one or more producer threads accessing the last node on the data structure. The thread may add an additional node by updating the next field of the last node to point to the additional node if a conditional synchronization primitive determines that the next field in the last node has not been modified.

In various embodiments, a request field including an indicator may be available which indicates whether the node it is referencing via its next field is functioning as a request node. A request identification field may be present in some embodiments that indicates a consumer thread which is available to process a data element. In some embodiments, a node may include one or more fields such as, but not limited to, a request field, a request value field, a value field, a requestor identification field, and a done field.

Some embodiments of the present invention provide for the first node of the one or more nodes to be a dummy node containing no data and pointing to the next node. In accordance with various embodiments, the system may also include a tail pointer pointing to the last node and/or a head pointer pointing to the first node.

Various embodiments allow for the data structure to operate in an empty state, a data state, and/or a request state. For example, according to one embodiment, the data structure may be in the empty state if the head pointer and the tail pointer both refer to the same node.

Various embodiments of the present invention determine an abstract state of the queue, wherein the abstract state of the queue is an empty state, a data state, or a request state.

In one embodiment, determining if the abstract state of the queue is a request state is based upon a positive indication in a request field of the node pointed to by the head pointer.

According to one embodiment, if the determined state of the queue is the request state, a consumer thread associated with a first request to accept elements added to the queue may be identified by reading a requester identification associated with a first request node. The request_value field of the first request node may be set to refer to a node containing an added element value by using a conditional synchronization primitive. A mutex and condition variable associated with the identified consumer thread may then be obtained, the mutex locked, the condition variable signaled and the mutex unlocked, thus awakening the consumer thread and notifying the consumer thread that an element is ready for processing. In some embodiments, a determination may be made that the consumer thread timed out if the conditional synchronization primitive failed and the value in the request_value field was set to an asserted value, such as a non-zero value (e.g., one). Some embodiments continue to add the element either to another request node or data node.

In one embodiment, the done field in a request node of the queue indicates whether the waiting thread needs to be signaled. The done field is set and accessed via a test and set primitive.

If the determined abstract state of the queue is the data state, a determination of whether the tail pointer is not pointing to the last node by using the next field value of the node indicated by the tail pointer may occur. Then, a conditional synchronization primitive may be used to change the tail pointer to the value of the next field value of the node indicated currently by the tail pointer.

In various embodiments, a lock-free method of removing elements from a data structure accessible by one or more producer threads and one or more consumer threads are provided. In one embodiment, the method may include the following: 1) accessing a head pointer indicating a dummy node and reading a value from the next field of the dummy node, wherein the value from the next field of the dummy node points to a data node; 2) using a conditional synchronization primitive to change the head pointer to point to the data node if the head pointer has not been modified since it was accessed by the consumer thread; and 3) copying data stored in the data node to local memory associated with the consumer thread.

Some embodiments of the present invention provide a method for managing a dual queue that can enter a data state, an empty state, and a request state. In some embodiments an add operation and a remove operation are defined on the queue. According to one embodiment, the empty state is initially entered.

In one embodiment, the method may involve adding specified data to the queue and transitioning the state of the queue to the data state, in response to receiving an add operation while in the empty state. The method may further involve adding a request to the queue and transitioning the state of the queue to the request state, if a remove operation is received while in the empty state.

In one embodiment, the method may involve removing data from the queue and transitioning the state of the queue to the empty state if no more data exists on the queue after removing the data from the queue, or remaining in the data state if data exists on the queue after removing the data from the queue, in response to receiving a remove operation while in the data state. If an add operation is received while in the data state, one embodiment adds the specified data to the queue and the queue remains in the data state.

In one embodiment, in response to a remove operation while in the request state, the method may add a request to the queue and the state of the queue may remain in the request state. In one embodiment, in response to an add operation while in the request state, the method may fulfill the request with data specified in the add operation and the state of the queue may transition to the empty state if no additional requests exist on the queue after removing the request from the queue, or the state of the queue may remain in the request state if one or more additional requests exist on the queue after removing the request from the queue.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

Figure 1:
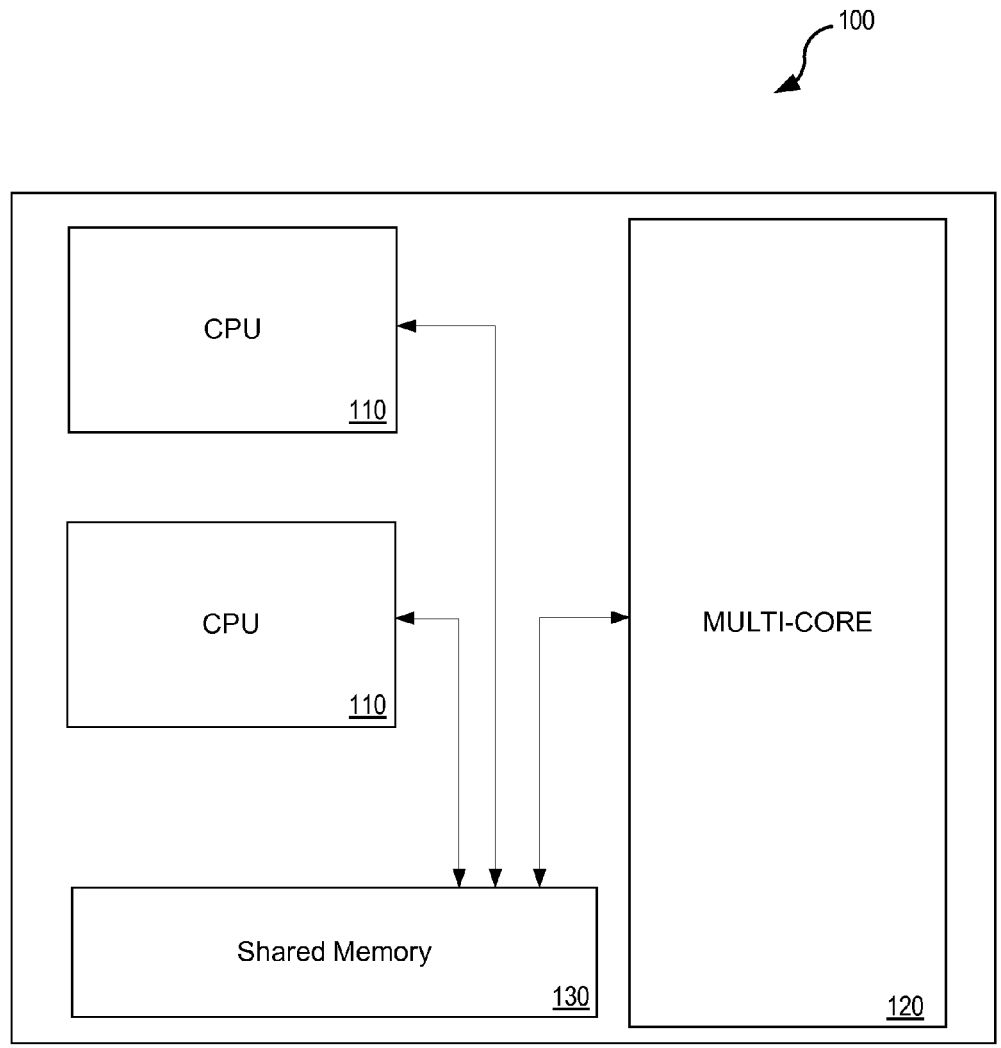
FIG. 1 illustrates an exemplary system with multiple processors utilizing a shared resource with which embodiments of the present invention may be utilized.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to systems and methods for employing software data structures. More specifically, the embodiments of the present invention relate to lock-free dual queues with conditional synchronization and time-outs. The lock-free dual queues of various embodiments of the present invention are accessible by one or more consumer threads and one or more producer threads. The consuming threads are able to access and remove elements from the queue while the producer threads are able to access and add elements to the queue. In some cases, a thread may be both a consuming thread and a producer thread.

In some embodiments of the present invention, nodes provide a unit within a queue for storing data elements, instructions, and/or other information. Each node provides information about the logical order of the elements in the queue. In some embodiments, each node includes a next field referring to a logically subsequent node and the next field of the last node does not point to another node. Each node may also include other fields such as a request field, a request value field, a value field, a requester identification field, and/or a done field.

Various embodiments of systems and methods generally read a shared state into local memory (typically registers), modify values in local memory to effect the desired operation, and attempt to write back the changed values to the shared memory using a conditional synchronization primitive. Examples of a conditional synchronization primitive include, but are not limited to a compare and swap (CAS) instruction, a load-linked/store-conditional (LL/SC) instruction, and other platform specific operations that atomically perform a read-compare-branch-write as a single hardware instruction. If the conditional synchronization primitive, such as the CAS, fails, i.e., some other thread modified the shared state between the read and the CAS, then the operation loops back to try again and starts with reading the updated values of the shared state.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product that may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to communication networks and computer systems, embodiments of the present invention are equally applicable to various other systems which may use a shared resource, such as a dual queue, for example, that is accessible by multiple system components.

For the sake of illustration, various embodiments of the present invention have herein been described in the context of computer programs, physical components, and logical interactions within modern computer and communication networks. Importantly, while these embodiments describe various aspects of the invention in relation to modern computer networks and programs, the method and apparatus described herein are equally applicable to other systems, devices, and networks, as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices such as, but not limited to, cell phone networks, voice over Internet protocol (VoIP) networks, messaging systems, and compatible devices. In addition, embodiments are applicable to all levels of computing from the personal computer to large network mainframes and servers.

TERMINOLOGY

Brief definitions of terms, abbreviations, and phrases used throughout this application are given below.

The phrase "communication network" or term "network" generally refers to a group of interconnected devices capable of exchanging information. A communication network may be as few as several personal computers on a Local Area Network (LAN) or as large as the Internet, a worldwide network of computers. As used herein "communication network" is intended to encompass any network capable of transmitting information from one entity to another. In one particular case, a communication network is a Voice over Internet Protocol (VoIP) network. In some cases, a communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

The phrases "conditional synchronization primitive", "conditional synchronization instruction", and "synchronization primitive" generally refer to atomic instructions that test a condition and then performs some action if the condition is satisfied. In some embodiments this involves comparing the contents of a memory location to a given value then conditionally updating the memory location with some other specified value. In such embodiments, if the values of the memory location and the given value are the same, the instruction modifies the contents of that memory location to a given new value. If the values are not the same then the contents of the memory location are not updated. According to various embodiments of the present invention, examples of conditional synchronization instructions include, but are not limited to, compare and swap (CAS) instructions, load-linked/store-conditional instructions (LL/SC), or other atomic instructions implemented on a computing platform.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrase "lock-free" generally refers to algorithms that do not protect access to shared data with locks (e.g., a mutex lock or a semaphore). Instead, lock-free algorithms permit multiple simultaneous executions on a shared object, such as a queue. Typically, lock-free algorithms avoid the use of mutex locks or any other type of shared object locking mechanism.

If the specification states a component or feature "may", "can", "could", or "might" be included or have a characteristic, that particular component or feature is not required to be included or have the characteristic.

The term "node" generally refers to a unit within a queue for storing data elements, instructions, request, and/or other information. According to various embodiments of the present invention, a node may include one or more fields for storing a variety of information, data, and/or instructions.

For example, in one embodiment, a node may include one or more of the following fields: 1) a next field; 2) a request field; 3) a request_value field; 4) a value field; 5) a requestor_id field; and 6) a done field. In various embodiments, the fields indicate the state of the queue (e.g., EMPTY, DATA, or REQUESTS). In accordance with some embodiments, the next field provides a pointer to a subsequent node in the queue, the request field provides a Boolean value set to TRUE if the node referenced by the next field represents a request, the request_value field provides a pointer to the data node fulfilling a request, the value field provides a data value, or other element, added to the queue, the requestor_id field identifies the thread that made the request, and the done field determines whether a requesting thread needs to be signaled. Various embodiments of the present invention allow for a node to act as a dummy node, a data node, and/or a request node. In some cases, the role a node plays may change over time as elements are added and/or removed from the queue. In some embodiments, the nodes provide a place for storing data elements, instructions, request, and/or other information and provide an order to these stored elements. For example, in one embodiment, the next field of a node stores an address, or a pointer, to a subsequent node.

The phrase "non-blocking algorithm" generally refers to an algorithm in which the delay or termination of any thread will not block progress on any other thread. For example, a non-blocking algorithm may be designed to avoid requiring a critical section (i.e., preventing concurrent access to a shared resource that must not be concurrently accessed by more than one thread of execution).

The term "responsive" includes completely or partially responsive.

The phrases "memory store" or "data store" generally refer to any device, mechanism, or populated data structure used for storing information. For purposes of this patent application, "memory store" or "data store" are intended to encompass, but are not limited to, one or more databases, one or more tables, one or more files, volatile memory, nonvolatile memory and dynamic memory. By way of further illustration, for example, random access memory, memory storage devices, and other recording media are covered by the phrase "memory store" or "data store." Common examples of a memory store include, but are not limited to, magnetic media such as floppy disks, magnetic tapes, hard drives and/or the like. Other examples of "memory stores" include SIMMs, SDRAM, DIMMs, RDRAM, DDR RAM, SODIMMS, optical memory devices such as compact disks, DVDs, and/or the like. In addition, a "memory store" may include one or more disk drives, flash drives, databases, local cache memories, processor cache memories, relational databases, flat databases, and/or the like. This list is no way meant to be an exhaustive list of devices and/or data structures falling with in the definition of "memory store," but is instead meant to highlight some examples. Those skilled in the art will appreciate many additional devices and techniques for storing information that are intended to be included within the phrase "memory store."

In many software and/or hardware applications, queues are data structures to which data elements, messages, instructions, events, and/or other objects may be added and removed. A queue may operate in one or more modes such as First-In-First-Out (FIFO), Last-In-First-Out (LIFO), and the like. For example, in a FIFO queue used by many software applications, the elements are removed in the order that they are added.

A queue may be used for many purposes. For example, a queue allows the decoupling of one or more producers of data elements from one or more consumers of the data elements. Producers and consumers are frequently different threads of execution (or simply threads, for short) within one or more processes. A queue tying together a set of producers and consumers is maintained in memory shared by all (easily achieved by threads executing in a single process address space) and is acted upon directly by each of the different threads representing the producers and consumers.

According to various embodiments, the consumer and producer threads may act upon the queue by invoking two defined operations: add and remove. The add and remove operations provide a mechanism to add an element to the "tail" of the queue and remove the element at the "head" of the queue, respectively. The implementations of the operations expect the queue to be in a particular state when invoked and leave the queue in a particular state when the operation is completed. During execution of add and remove operations, the state of the queue is read from memory, the value representing the state is modified, and then the new value is written back to the memory representing the queue.

In conventional systems, multiple operations executing simultaneously on a traditional queue has generally lead to errors in modifying the queue state because one thread will read the state and begin modifying it while another thread changes the queue state to something incompatible with what the first thread is going to write back. These errors occur because it is generally assumed in the implementation of operations that nothing else is modifying the queue while the operation is executing, i.e., operations execute atomically. To solve this problem, traditional queues have provided that the threads all "take turns" executing operations on a shared queue, i.e., access from multiple threads is serialized. This discipline of access is enforced in the operations by using mutual exclusion locks ("mutexes") that block all threads but one from executing an operation. When a thread is done executing an operation, the next thread waiting is then allowed to execute. When the threads are all executing on a single processor, only one thread can execute at a time. Consequently, the resources are being adequately utilized. In contrast, when the process is executing on a multiprocessor system, this serialization of operation execution reduces the gain in throughput that would have otherwise occurred by having the threads executing on the multiple processors simultaneously. In addition to not maximizing the resource utilization, some traditional solutions can result in a thread acquiring a mutex and then being preempted by the operating system scheduler before the thread releases the mutex. Consequently, all other threads that need to execute a queue operation are typically blocked until the preempted thread resumes execution and releases the mutex.

Embodiments of the present invention remove the need for serialization by requiring a consistent state at each update of the shared state during operation execution rather than only at exit from the operation. In various embodiments, multiple threads may be operating on a single queue at the same time. Consequently, there can be multiple operations executing simultaneously.

In accordance with various embodiments of the present invention, lock-free manipulation of a shared object state may require a read-modify-write sequence that reads the object state in shared memory into local memory (e.g., registers), modifies the values according to the change being made, and then writes the values back to the shared object memory. To avoid the potential inconsistency by having multiple threads making changes at the same time, various embodiments of the present invention allow for the changes to be written back to the shared object (e.g., queue) only if the shared state hasn't changed since the shared state was read by the thread attempting to make the change. This check of whether the state has changed has conventionally involved a read instruction, compare instruction, branch instruction, and write instruction, which can result in errors; e.g., a thread can write to shared memory after the shared memory was read by a second thread but before the shared memory is written to by the second thread.

Embodiments described herein address this and other problems by using instructions known as conditional synchronization primitives that atomically perform the read-compare-branch-write as a single hardware instruction. Two common types of conditional synchronization primitives are compare-and-swap (CAS) and load-linked/store-conditional (LL/SC) instructions. For example, the CAS instruction is available on processor architectures such as SPARC and Intel. In other environments where a LL/SC is available and a CAS instruction is not, CAS semantics can be implemented using LL/SC instructions.

According to various embodiments, conditional synchronization primitives may act on only a single word of memory. In these embodiments, the lock-free algorithms must be designed such that critical transitions, i.e., from one consistent state to another, can be effected by the modification of shared state contained within that single word of memory.

Various embodiments of the present invention generally operate by having a thread read a shared state into local memory (typically registers), modify values in local memory to effect the desired operation, then attempt to write back the changed values to the shared memory using a conditional synchronization primitive such as a CAS. If the conditional synchronization primitive, such as the CAS, fails, i.e., some other thread modified the shared state between the read and the CAS, the thread loops back to try again, starting with reading in the updated values of the shared state.

In some embodiments, hazard pointers are used to advertise which shared objects are being referenced by each thread accessing the data structure. When the owner thread of a shared object has determined that the object is no longer needed as part of the overall data structure, the owner thread places the object on a retirement list. When there is some number of objects to be retired, the thread deletes those objects for which no other thread has a hazard pointer referencing them.

FIG. 1 illustrates an exemplary system 100 with multiple processors utilizing a shared resource with which embodiments of the present invention may be utilized. According to various embodiments of the present invention, system 100 may include one or more processors 110, one or more multi-core microprocessor 120, and shared memory 130. Each processor 110 or multi-core processor 120 may be a part of a component of a larger system. For example, embodiments of the present invention may be used in communication networks. Various components within the network may each have one or more processors or multiple processor cores which share a common resource. For example, messages (e.g. TCP/IP, UDP, RSVP, and others) entering a network may need to be buffered, or queued, before they are able to be processed by a media gateway controller, an edge proxy server, a core proxy server, and/or some other component within the communication network. In some cases, each of these components may have one or more processors and/or one or more multi-core processors that are able to remove or process messages from the queue.

Multi-core microprocessor 120 is a microprocessor that combines two or more independent processors into a single package, often a single integrated circuit (IC). According to various embodiments, multi-core microprocessor 120 allows a computing device to exhibit some form of thread-level parallelism (TLP) without including multiple microprocessors in separate physical packages.

Shared memory 130 is a resource shared by each of the processors 110 and the multi-cores 120. Processors 110 and multi-cores 120 are typically running some type of application. In some cases, an application may be divided up into one or more threads. In some embodiments, shared memory 130 contains a queue that is able to buffer data elements used or generated by the threads. Examples of data elements include, but are not limited to, messages, data, and instructions.

Figure 2:
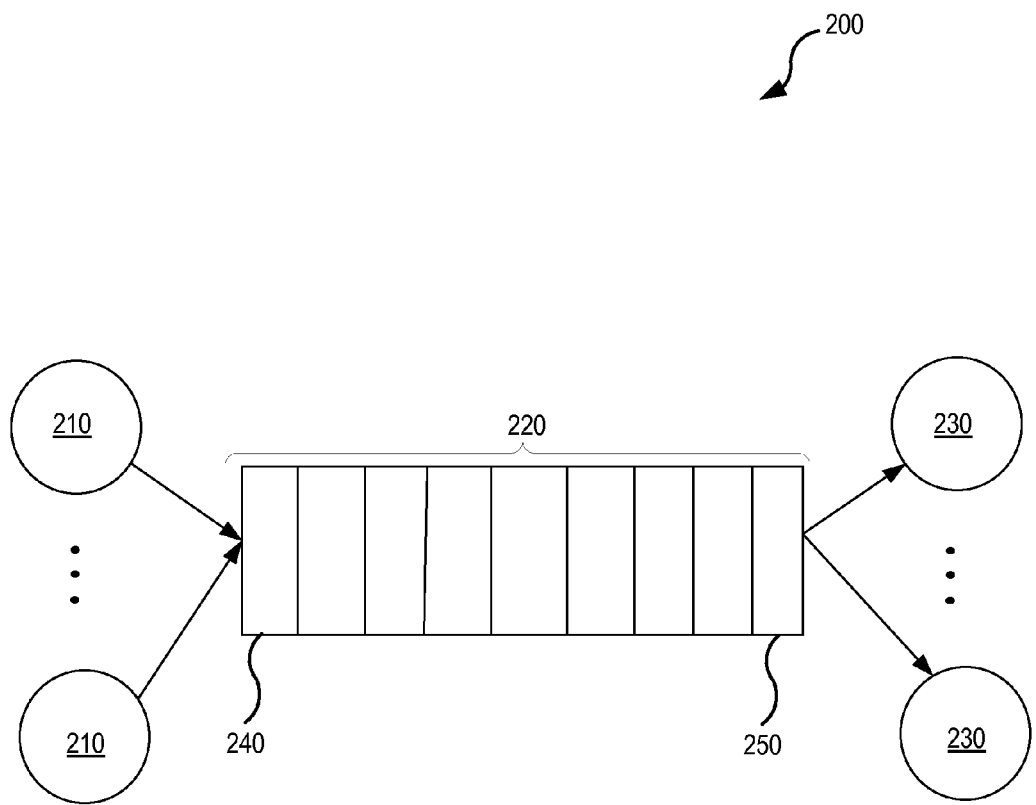
FIG. 2 illustrates an exemplary system with a queue being used by multiple consumer threads and multiple producer threads in accordance with one or more embodiments of the present invention.

In some embodiments, the queue may be logically positioned between one or more producer threads and one or more consumer threads. A producer thread is a thread that can add elements to the queue while a consumer thread is a thread that can remove elements from the queue. In some embodiments, a thread may be both a consumer thread and a producer thread. FIG. 2 illustrates an exemplary system 200 with a queue 220 being used by multiple consumer threads 230 and multiple producer threads 210 in accordance with one or more embodiments of the present invention. Queue 220 may be apportioned into a plurality of segments or queue positions, each of which can store information, data elements, requests, and the like. The segments may be logically ordered. Elements are typically added to tail 240 of queue 220 by producer threads 210. Elements stored in the queue are typically removed from the head 250 of queue 220 by consumer threads 230.

Figure 3:
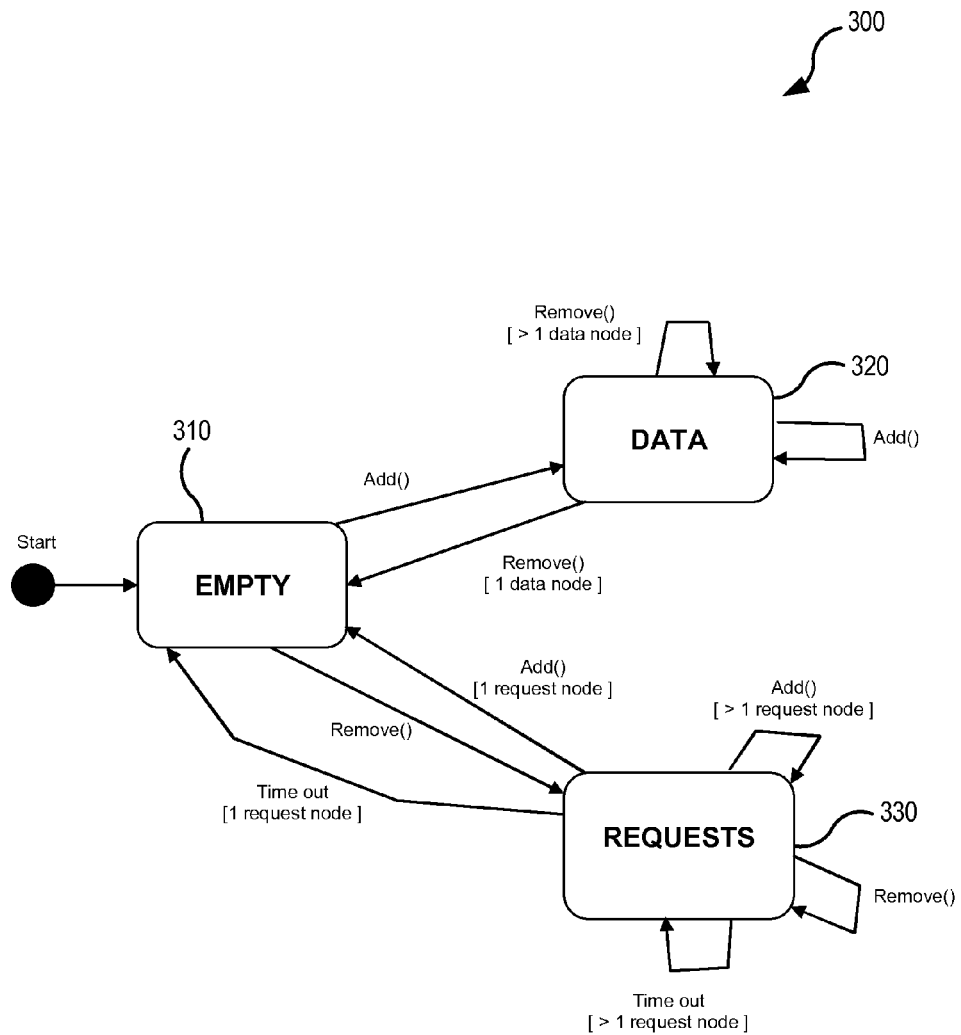
FIG. 3 illustrates an exemplary finite state machine description of a lock-free dual queue in accordance with various embodiments of the present invention.

FIG. 3 illustrates an exemplary finite state machine 300 including functional states of a lock-free dual queue in accordance with various embodiments of the present invention. According to various embodiments, at least two operations, an add operation and a remove operation, may be used to add and remove elements from queue 220. As illustrated in the embodiment depicted in FIG. 3, queue 220 can be in one of three basic states: EMPTY, DATA, or REQUESTS. As will be described in more detail below, in various embodiments of the present invention, the effect of the add and remove operations depends on the state of queue 220.

In one embodiment, the DATA state indicates the queue has one or more entries each containing a data element added by an add operation. In one embodiment, the REQUESTS state indicates the queue has one or more entries representing a request from a thread waiting for a data element to be added. In one embodiment, the EMPTY state indicates that no entries are present in the queue.

According to various embodiments, when an add operation is performed on a queue in an EMPTY state 310, a data element is added to the queue and the state of the queue transitions to DATA state 320. In the embodiment depicted in FIG. 3, an add operation performed on a queue in DATA state 320 remains in that state and adds another data element to the end of the queue. In one embodiment, an add operation performed on a queue in REQUESTS state 330 adds a data element to the request at the head of the queue and removes the request from the queue while the thread waiting on the request awakens and returns from the remove operation that created the request and returns the data element. If there was only one request in the queue, the queue transitions to EMPTY state 310, otherwise the queue remains in REQUESTS state 330 because there are more requests to be fulfilled.

According to some embodiments, when a remove operation is performed on a queue in EMPTY state 310, a request is added to the queue and the thread performing the remove waits for the request to be fulfilled by an add operation executed by some other thread; the queue transitions into the REQUESTS state 330. A remove operation performed on a queue in the REQUESTS state 330 remains in that state as depicted in FIG. 3; a request is created and added to the end of the queue, then the thread is instructed to wait. A remove operation performed on a queue in DATA state 320 removes the data entry at the head of the queue and returns the data value. If there was only one data entry in the queue, the queue transitions into EMPTY state 310, otherwise the queue remains in DATA state 320.

In one or more embodiments, a remove operation may be invoked with a time out value. If a time out value is provided and the remove operation creates a request, the request will time out if the request is not fulfilled before the time out interval passes. If the request times out, the thread that invoked the remove will awaken and is notified that the remove operation is returning due to a time out. The request is removed from the queue. If that was the only request in the queue, the queue state transitions to EMPTY state 310; otherwise, the queue state remains in REQUESTS state 330.

Figure 4A:
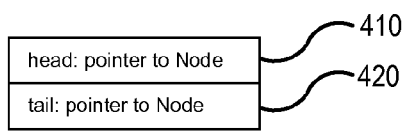
FIGS. 4A-4C illustrate exemplary data fields which may be used in accordance with some embodiments of the present invention.
Figure 4B:
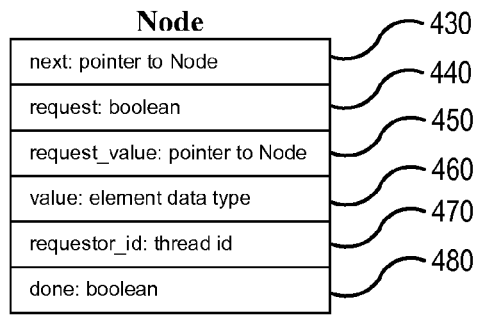
Figure 4C:
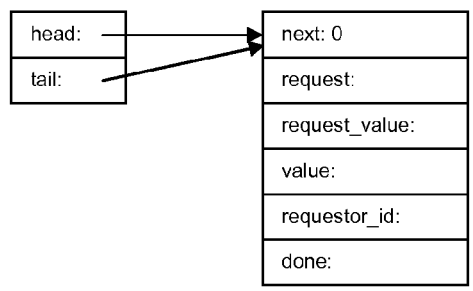

FIGS. 4A-4C illustrate exemplary fields that may be used in accordance with some embodiments of the present invention. According to some embodiments of the present invention, queue 220 may be represented by a linked list of nodes, pointed to by a head pointer 410 and tail pointer 420 as depicted in FIG. 4A. In these embodiments, head pointer 410 points to the first node in the linked list, the tail pointer 420 points to the last node in the linked list, and each node, starting with the first node, points to the next node in the list, until the last node is reached. The last node is distinguished in that the last node doesn't point to another node. According to one embodiment, the queue is empty if head pointer 410 and tail pointer 420 both refer to the same node.

In one embodiment, hazard pointers are used for memory management (i.e., determining when a shared memory object is available to be reused). One benefit of using hazard pointers is the elimination of dangling references which can occur as a result of one thread deleting an object while another still has a reference to the object, a serious concern in non-blocking algorithms. This implementation also avoids the ABA problem.

In some embodiments, the nodes may have six fields as depicted in FIG. 4B: a next field 430 that provides a pointer to the next node in the list; a request field 440 that provides a Boolean value set to TRUE if the node referenced by next represents a request; a request_value 450 field that provides a pointer to the data node fulfilling a request; a value field 460 that provides the data value added to the queue; a requestor_id field 470, which identifies the thread that made the request; and a done field 480 that determines whether a requesting thread needs to be signaled. In different embodiments, nodes play different roles. Moreover, the same node can move from one role to another. In some embodiments, only a subset of the fields may be used in any given role.

According to various embodiments, a node can represent three basic entities in the queue, corresponding to the role the node is playing. A node may be a dummy node, a data node, or a request node. In some embodiments, there is one and only one dummy node in the queue as depicted in FIG. 4C. According to one embodiment, a dummy node is always the first node in the linked list and, therefore, is always the node pointed to by the head pointer. A dummy node represents a placeholder that simplifies queue operations by eliminating the need to deal with the special cases of adding to an EMPTY queue or removing the only node.

Figure 5:
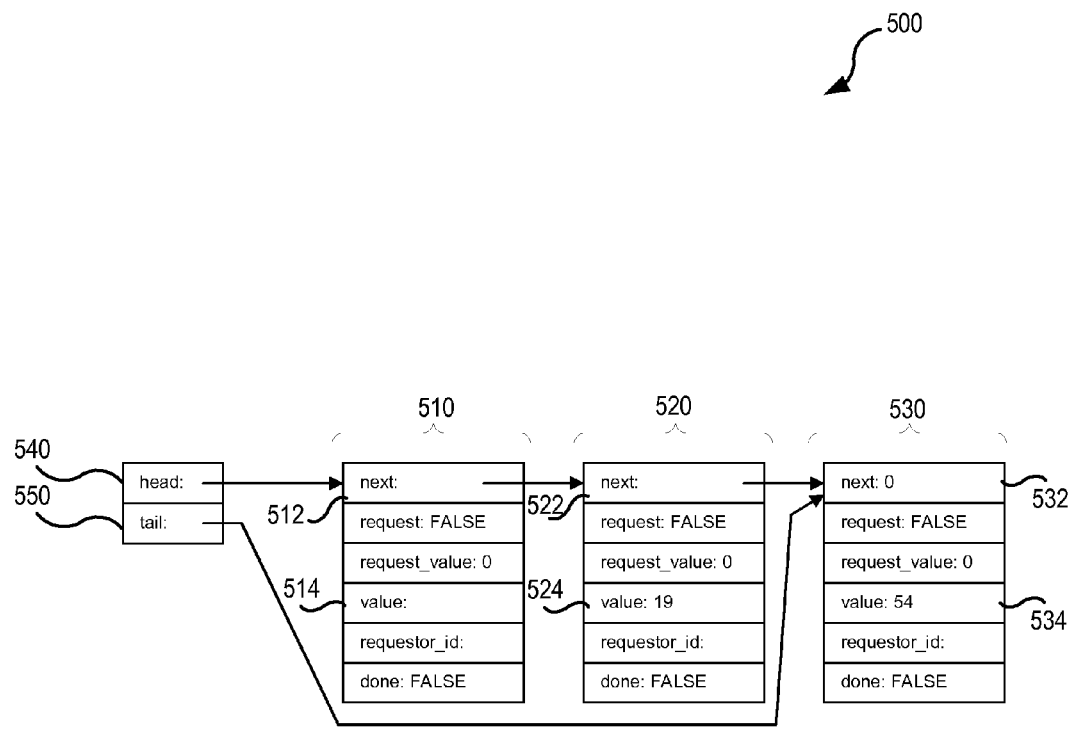
FIG. 5 illustrates an exemplary queue represented by nodes which may be used in accordance with one or more embodiments of the present invention.

FIG. 5 illustrates an exemplary queue 500 represented by nodes 510, 520, and 530 that may be used in accordance with one or more embodiments of the present invention. According to various embodiments, a data node, such as nodes 520 and 530, may be configured to store a data value passed in via an add operation. The data value is represented by the value field associated with a node. For example, in FIG. 5, node 510 is a dummy node and as such no value is stored in value field 514. In node 520 nineteen is stored in value field 524. In node 530, fifty-four is stored in value field 534. As previously described, head pointer 540 points to the dummy node and tail pointer 550 points to last node of the queue.

In some embodiments, the next field of a new node is initialized to zero ("null") and the request field is initialized to FALSE because the node could be added to the end of the list. If the add operation is performed on a queue in either the DATA or EMPTY state, the data node is added to the end of the linked list. In either case, the previous node's next field is set to the address of the newly added data node. If the add operation is performed on a queue in the REQUESTS state, the request_value field of the first unfulfilled request node in the queue is set to the address of the new data node. Consequently, each node points to a subsequent node through the use of the next fields 512, 522, and 532. This provides an order to the nodes.

Figure 6:
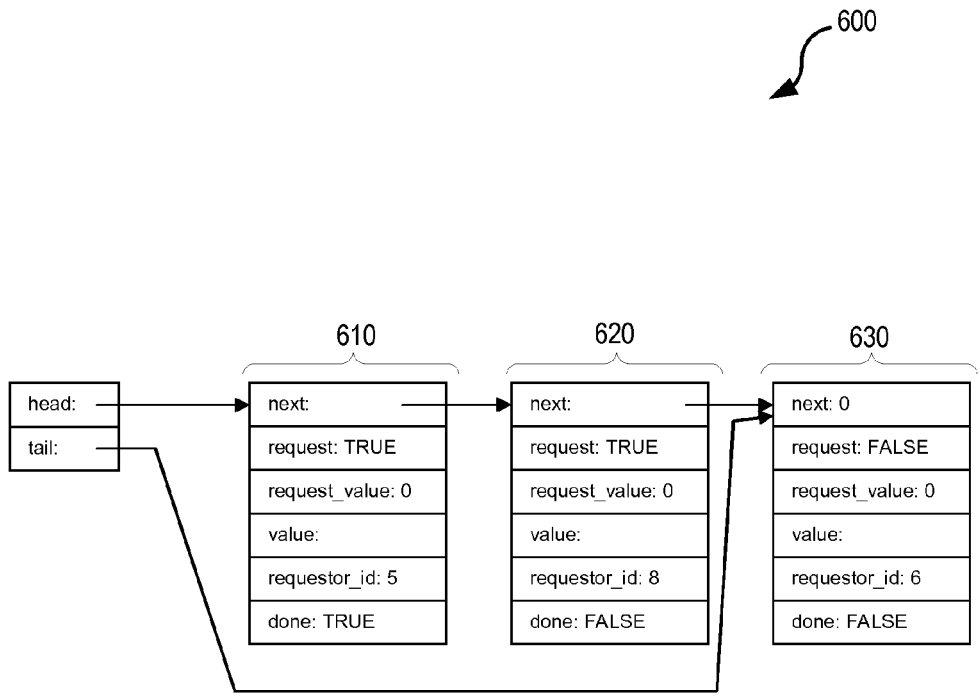
FIG. 6 illustrates an exemplary queue represented by request nodes which may be used in accordance with various embodiments of the present invention.

FIG. 6 illustrates an exemplary queue represented by request nodes that may be used in accordance with various embodiments of the present invention. According to various embodiments, a request node, such as nodes 620 and 630, represent the request of a thread that executed a remove operation on a queue that did not contain any data nodes. In other words, when the remove operation occurred, the queue was in either the EMPTY or REQUESTS state. Because the queue was in either the EMPTY or REQUESTS state, a new node is created by the remove operation and the node is initialized to have the requestor_id field identify the requesting thread. The request field is initialized to FALSE and the next field is initialized to zero since the node is being added to the end of the list. When the last node is modified to address the new request node, i.e., its next field is assigned the address of the new request node, the last node's request field is set to TRUE to indicate that the last node is referencing a request node.

In various embodiments, two operations, the add operation and the remove operation are available. Depending on the embodiment, these operations may operate on the queue differently depending on the state of the queue at the time of the operation. Flowcharts for illustrating the behavior of these two operations according to one embodiment are discussed in more detail with reference to FIGS. 13A-B and FIGS. 14A-14C.

In one embodiment, the head pointer always refers to the first node in the list, which may be a dummy node and the tail pointer points to either the last node or the next to last node. The tail pointer must point to the last node before another node can be added, but the tail pointer can otherwise point to the next to last node since a new node is added to the list before the tail pointer gets updated.

Figure 7A:
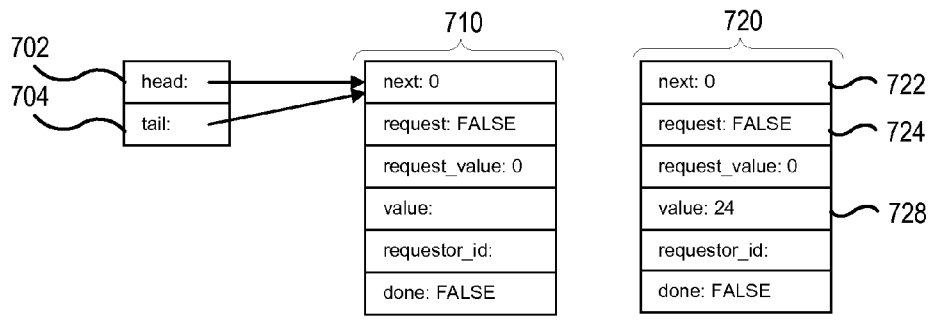
FIGS. 7A-7C illustrate how an exemplary add operation may add a data node to a queue in accordance with various embodiments of the present invention.
Figure 7B:
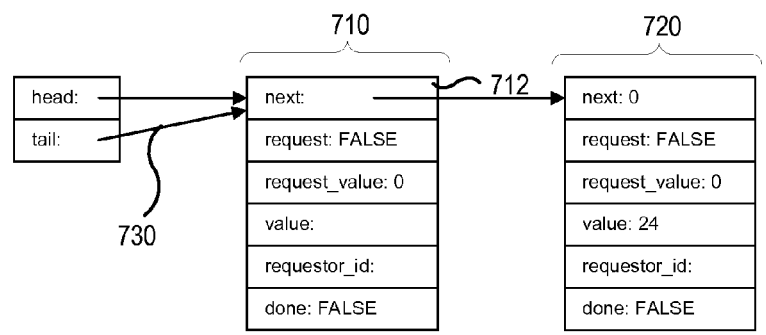
Figure 7C:
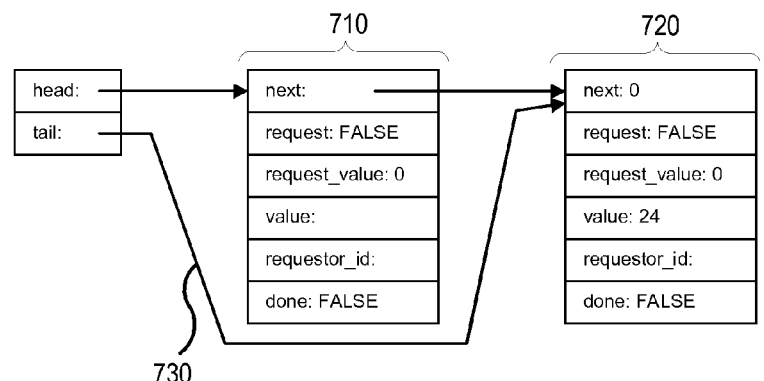

FIGS. 7A-7C illustrate how an exemplary add operation may add additional elements to a queue in accordance with various embodiments of the present invention. According to one embodiment of the present invention, an add operation may take a single parameter such as the data value to add to the queue. In one embodiment, the add operation creates a new data node. For example, starting with the queue illustrated in FIG. 4C where only a dummy node (shown as 710 in FIG. 7A) is present along with a head and tail pointer. The newly created node 720 is shown in FIG. 7A. In some embodiments, creating a node means that a section of memory is reserved for use and unreserved when the user is done.

After a node has been created or reserved, the add operation may set the next field 722 to zero, the request field 724 to FALSE, and the value field 728 to the value of the parameter passed in. The shared head pointer 702 and tail pointer 704 values are read into local memory associated with the thread requesting the add operation. In one embodiment, hazard pointers may then be assigned.

If the queue is in the EMPTY state, dummy node 710 addressed by head pointer 702 may have a zero (or other unasserted or null indicator) in the next field indicating that dummy node 710 is the last and only node in the queue. If the queue is in the DATA state, the dummy node's next field is non-zero (i.e., the dummy node's next field points to another node) and request field is FALSE.

According to one embodiment, if tail pointer 704 is not pointing to the last node, i.e., the next field of the node referenced by the tail pointer is not zero, then a conditional synchronization primitive (e.g., a CAS instruction or other) may be performed to attempt to change the value of the tail pointer from its current value to that of the referenced node's next field. The add operation then starts over by looping back to reread the head and tail pointers.

If the tail pointer was pointing to the last node, the add operation, according to one embodiment, attempts to modify the next field of the last node by performing a conditional synchronization primitive (e.g., a CAS instruction or other) that attempts to change the next field from zero (which it should be as the last node) to the address of the new data node. If the conditional synchronization primitive failed, then some other thread must have added a node to the list since this thread read the tail pointer and checked the last node's next field. In one embodiment, if a failure occurs, the operation then loops back to start over by rereading the head and tail pointers.

FIG. 7B illustrates a successful completion of the conditional synchronization primitive that was attempting to modify the next field 712. As shown in FIG. 7B, next field 712 now points to the new node 720. As illustrated in FIG. 7C, if the conditional synchronization primitive of the last node's next field succeeded, the add operation then attempts to perform a conditional synchronization primitive on the tail pointer 704 to change the tail pointer from the old last node's address, which was that of the dummy node 710 in this example, to the address of the newly added node 720. Consequently, tail pointer 704 no longer points 730 to dummy node 710, but instead has been modified to point to newly added node 720. According to various embodiments, regardless of whether this conditional synchronization primitive on the tail pointer succeeds, the operation is completed and control is returned to the calling context.

In accordance with various embodiments, an add operation is non-blocking when the queue is empty or contains data nodes because no thread has to wait for another thread to complete. In this case, if one thread has added a new node to the end, another thread does not have to wait for the first thread to update the tail pointer; the second thread can do it itself.

Figure 8A:
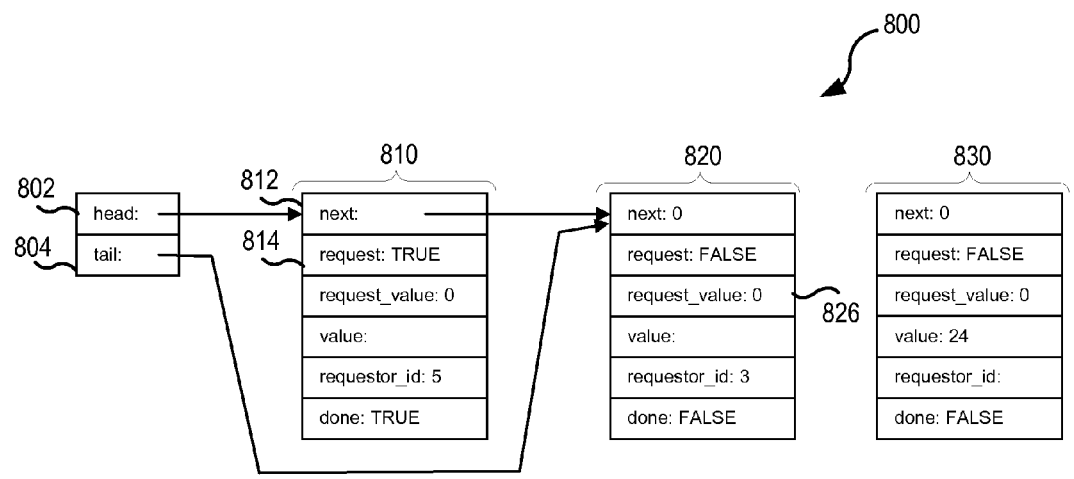
FIGS. 8A-8B illustrate how an exemplary add operation may fulfill a request in a queue in accordance with one or more embodiments of the present invention.
Figure 8B:
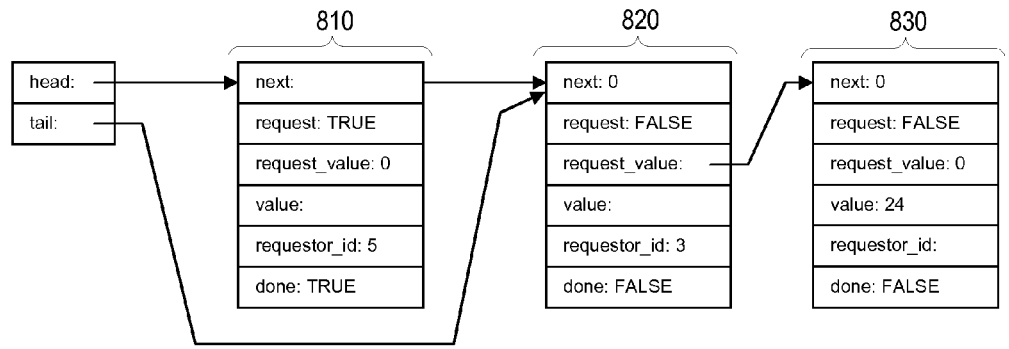

FIGS. 8A-8B illustrate how an exemplary add operation may add one or more nodes to a queue 800 in accordance with embodiments of the present invention. According to some embodiments, when a queue is in the REQUESTS state, the dummy node 810, which the head pointer 802 is pointing to, has a request field 814 set to TRUE and a non-zero next field 812.

As illustrated in FIG. 8A, the node referenced by dummy node 810 is the first request node 820 in queue 800. If the request node's request_value field 826 is zero, the add operation performs a conditional synchronization primitive instruction (e.g., a CAS instruction or other) to attempt to change the value of the request_value field 826 from zero to the address of the new data node 830, then the request_value field 826 is reread into local memory. If the conditional synchronization primitive (e.g., a CAS instruction or other) succeeded, the queue objects are as depicted in FIG. 8B; the request is said to be fulfilled at this point, which means the data value is available for the requesting thread.

Figure 9A:
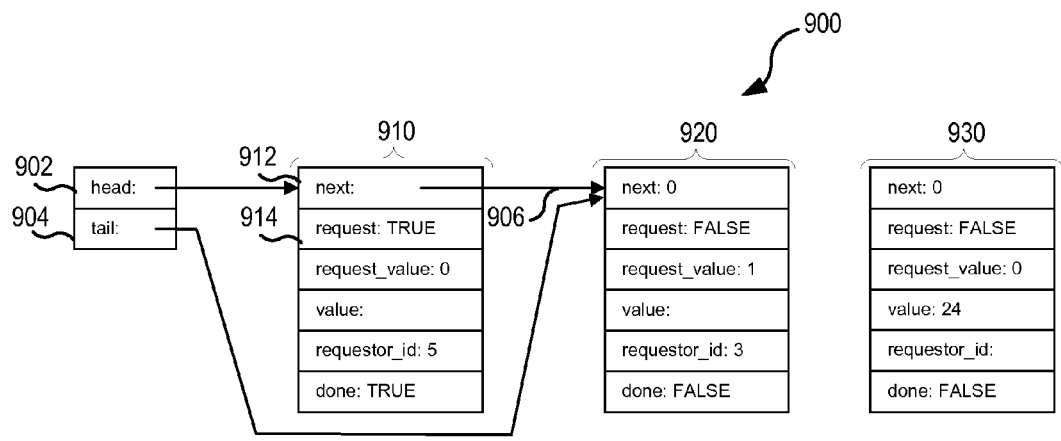
FIG. 9A illustrates how an exemplary remove operation can time-out and signal the time out status to threads executing add operations in accordance with multiple embodiments of the present invention.

FIG. 9A illustrates how an exemplary add operation may operate in accordance with some embodiments of the present invention. In accordance with one or more embodiments, failure of the conditional synchronization primitive (e.g., a CAS instruction or other) of the request_value field indicates that the requesting thread timed out and was able to use the conditional synchronization primitive to set the request_value field 926 to one. The add operation will then reread the head and tail pointers and start over.

Figure 9B:
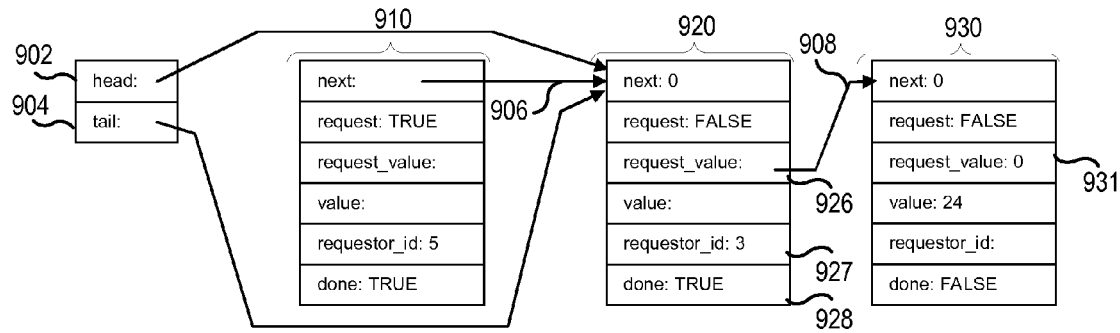
FIG. 9B illustrates how an exemplary add operation completes when fulfilling a request in accordance with some embodiments of the present invention.

FIG. 9B illustrates the final state an add operation fulfilling a request; the request nodes' request_value field points to the data node and the head pointer points to the request node, which now is the dummy node.

In one embodiment, after attempting to set the request node's request_value field 926, if the request_value field value is not one and a test-and-set of the done field 926 failed, then the operation uses the requestor_id field 927 value to obtain the mutex and condition variable unique to the requester thread, locks the mutex, signals the condition variable, then unlocks the mutex. This sequence of operations reawakens the requesting thread and notifies the requesting thread that the request_value field 926 has been set. The check of the request_value ensures that no signal is sent if the requesting thread timed out and the test-and-set of the done field ensures that the signal is sent only once and also prevents the signal from being sent if the requesting thread was able to get the request_value without waiting.

In various embodiments, the add operation then attempts executing a conditional synchronization primitive instruction on the head pointer 902 to change the head pointer from the current value (the dummy node address as indicated by arrow 906) to the address of the request node 920. If the conditional synchronization primitive instruction succeeds, the dummy node 910 is retired, making the request node 920 the new dummy node as illustrated in FIG. 9B.

In one embodiment, the fulfilled request node 920 becomes the dummy node of empty queue 900. If the request node's request_value field 926 is equal to the address of the new data node (as illustrated by arrow 908), meaning that the executing thread's data value was received by the requesting thread, the add operation is complete and execution is returned to the calling context. Otherwise, the operation loops back to reread head pointer 902 and tail pointer 904 and starts over.

Three main actions taken during an add operation on a request according to one embodiment include: 1) assigning a data node address to the request_value field; 2) signaling the requesting thread; and 3) updating the head pointer to remove the first node, can each be carried out by different threads. Since each action in this sequence may be executed by different threads performing add operations, blocking is avoided (no single preempted thread can delay progress), and thus the reawakening of the requesting thread may be expedited.

Figure 10A:
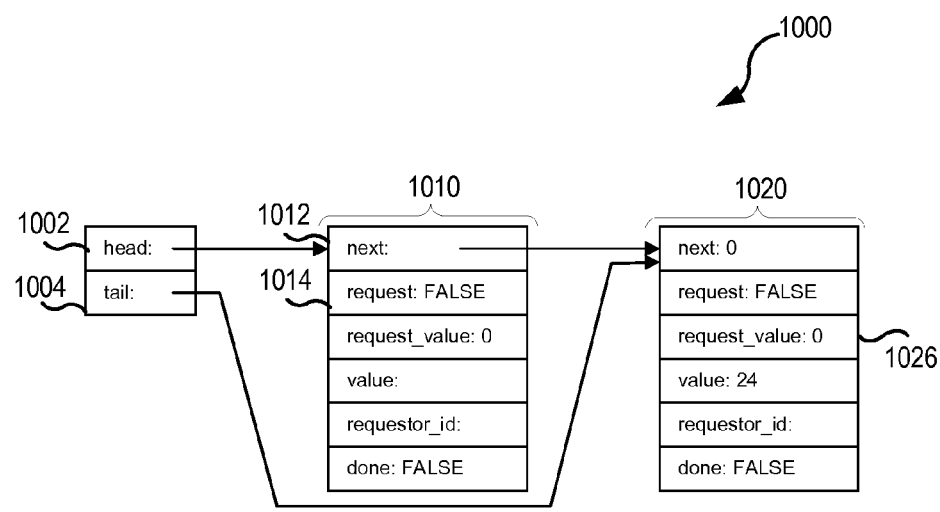
FIGS. 10A-10B illustrate how an exemplary remove operation may remove a node from a queue in accordance with various embodiments of the present invention.
Figure 10B:
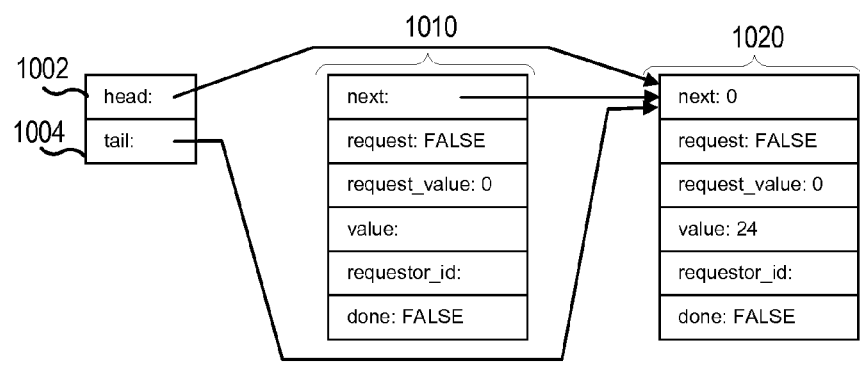

FIGS. 10A-10B illustrate how an exemplary remove operation may remove a node from queue 1000 in accordance with various embodiments of the present invention. According to various embodiments, a remove operation may take an output parameter, which is a reference to an object that holds an instance of the data values being held in the queue. In some embodiments, a remove operation may take an additional optional input parameter that specifies how long to wait for a data value to be added if the remove results in a request. In one embodiment, the return value from the remove operation may be a Boolean that indicates whether a data value was returned in the output parameter; it is TRUE unless the operation times out.

According to embodiments of the present invention, the length of the time out may depend on one or more factors such as, but not limited to, requesting thread identification, difficulty of the request, current and/or historical utilization of queue resources, current and/or historical system resource utilization, as well as others recognizable by those of ordinary skill in the art. In some embodiments, time out values are generally set so as to have a consumer thread wait long enough to account for the mean producer thread delay plus some multiple of standard deviation of the delay variation, determined by how certain normal delays should result in success and by the impact of delay of the consumer thread.

According to one embodiment, the remove operation first reads the shared head point value 1002 and tail pointer value 1004 into local memory and assigns the values to hazard pointers. In various embodiments of the present invention, the behavior of the remove operation from this point depends on the state of the queue.

For example, in one embodiment, an element may be removed from a queue containing data nodes (i.e. a queue in the DATA state, as illustrated by queue 1000). According to various embodiments, to be in the DATA state, the dummy node 1010 is addressed by the head pointer 1002, has a non-zero next field 1012 and FALSE in the request field 1014. This implies that at least one data node exists, such as data node 1020 illustrated in FIG. 10A.

In one embodiment, a remove operation reads the dummy node's next field 1012 and assigns the value to a hazard pointer. These operations ensure that some other thread performing a remove cannot delete the data node following the dummy.

The remove operation then attempts to perform a conditional synchronization instruction (e.g., a CAS instruction) according to one embodiment. The conditional synchronization instruction tries to change the head pointer 1002 from the dummy node's address to the address in the dummy node's next field 1012. If the conditional synchronization fails, that means that some other thread was able to complete the same instruction ahead of this thread and has returned the value in the data node 1020, so the operation loops back and starts over with rereading the shared head pointer 1002 and tail pointer 1004.

In accordance with one embodiment, if the conditional synchronization instruction succeeds, the operation retires the dummy node 1010 and reads the value from the data node's value field 1026. The value may then be assigned to the output parameter and the operation can then return TRUE, thus completing the remove operation. The data node 1020 from which the value was read is now the dummy node as illustrated by FIG. 10B. As such, the head pointer 1002 and the tail pointer 1004 now point to data node 1020, which is now the dummy node, thus effectively removing the data node.

According to various embodiments, when a thread executes the remove operation in the DATA state, the remove operation either succeeds in performing the conditional synchronization primitive instruction or some other thread succeeds, requiring the first thread to try again (of course, the state of the queue can change to EMPTY or even REQUESTS, so the next try can result in creating a request, as described next). Either way, no thread blocks and some thread is always succeeding.

When the queue is in the EMPTY or REQUESTS state, two distinct phases are present in a remove operation in at least one embodiment of the present invention: the first is to create a request node and append the request node to the end of the queue, and the second is to recognize that the request was fulfilled and to return the value.

According to one embodiment, if the dummy node's next field is zero, indicating the queue is empty, or request field is TRUE, indicating that the next node is a request node, the remove operation is creating a request. Since adding a request to the queue includes appending the request to the tail, the operation must first ensure that the tail pointer is actually pointing to the last node. The operation reads the next field of the node pointed to by the tail pointer, and if the next field isn't zero, a conditional synchronization primitive instruction is performed on the tail pointer to change the tail pointer from its current value to the address in the next field. This advances the tail pointer to next node. The operation then loops back and starts over by rereading the head and tail pointers.

Figure 11A:
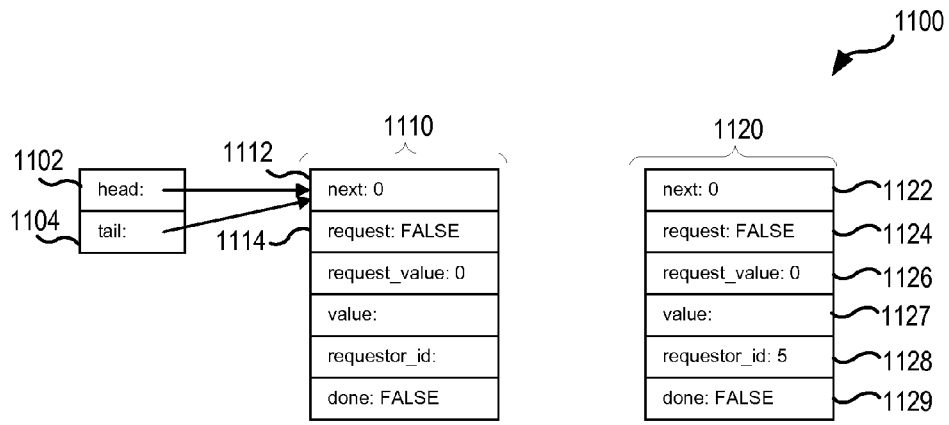
FIGS. 11A-11C illustrate how an exemplary remove operation may operate on a queue in an empty state in accordance with embodiments of the present invention.
Figure 11B:
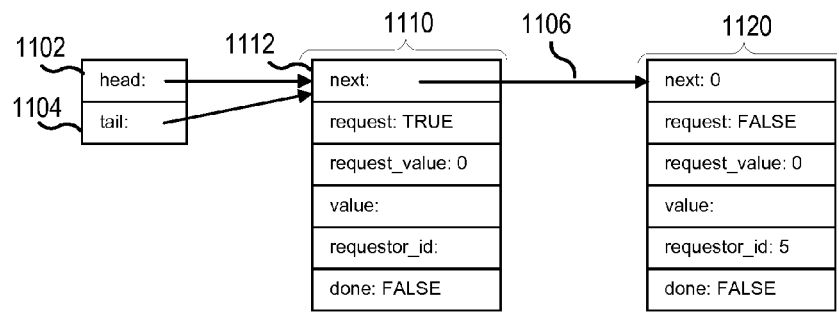
Figure 11C:
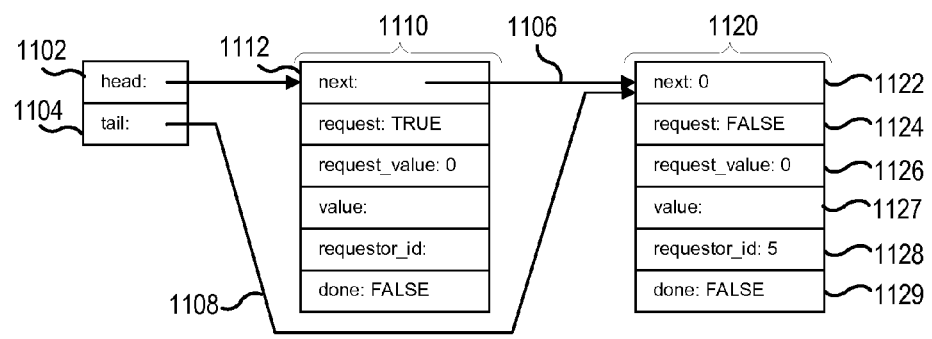

FIGS. 11A-11C illustrate how an exemplary remove operation may operate on queue 1100 in an EMPTY state. According to some embodiments, the remove operation creates a new node 1120, with the next field 1122 and request_value field 1126 set to zero, the requestor_id field 1128 set to the value identifying the thread executing the operation, and the request field 1124 and done field 1129 set to FALSE as illustrated in FIG. 11A. The address of the new (request) node 1120 is assigned to a hazard pointer to ensure that the new (request) node isn't deleted until this operation is done. The remove operation then attempts to perform a conditional synchronization instruction on the last node's next field (1112 in FIG. 11A) to change it from zero to the address of the request node. According to some embodiments, if the conditional synchronization instruction fails, that means that some other thread was able to add a node to the end of the list between the times the last node's next field was read and the conditional synchronization instruction was attempted. The operation may then loop back and start over by reading the new values of the shared head and tail pointers.

If the conditional synchronization instruction succeeds, the addition of the request to the queue is completed as illustrated in FIG. 11B with arrow 1106 showing that the value in next field 1112 points to node 1120.

In one embodiment, the operation then performs a conditional synchronization instruction on the shared tail pointer 1104 to change the shared tail pointer from the address of the last node (dummy node 1110 in FIGS. 11A-11C) to the address of the new node 1120. If the conditional synchronization instruction succeeds, then tail pointer 1104 points to new node 1120, as indicated by arrow 1108, and is as depicted in FIG. 11C. However, according to various embodiments the tail pointer update may not be required to succeed in order to continue the remove operation.

Figure 12:
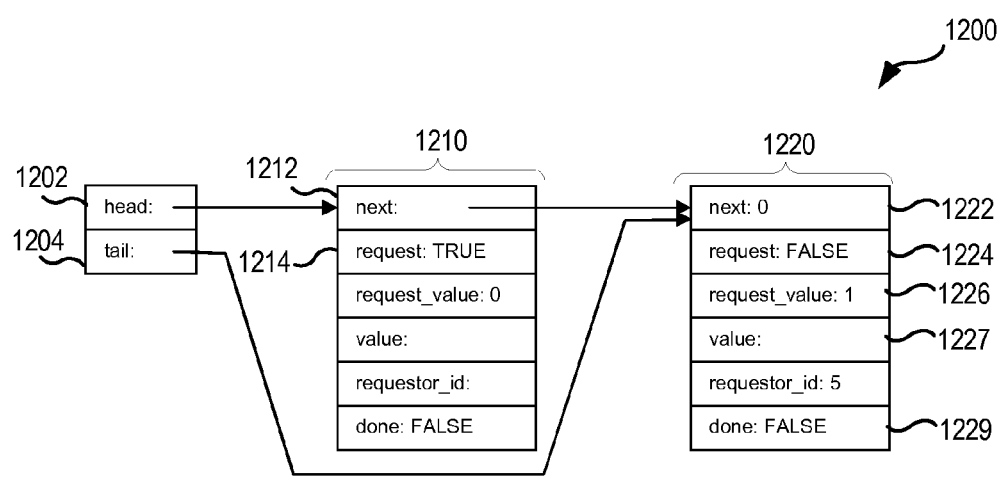
FIG. 12 illustrates how an exemplary node may be marked when a time out of a remove operation occurs in accordance with one or more embodiments of the present invention.

FIG. 12 illustrates how an exemplary node may be marked when a time out occurs in accordance with one or more embodiments of the present invention. According to some embodiments, the second phase of a remove operation starts by the operation reading the request_value field of the request node. If the request_value field of the request node is zero, this indicates that the request_value field has not been set to a data node address by a fulfilling thread. According to various embodiments, the thread's specific mutex may be locked and the request_value field 1226 may be checked again. If the value is still zero, the remove operation executes a wait operation on the thread's condition variable, causing the remove operation to wait for a signal from a fulfilling thread. If a time out value was provided, then the operation executes a timed wait on the condition variable.

In one embodiment, when the wait operation returns due to a time out, the operation attempts to perform a conditional synchronization primitive instruction (e.g., a CAS operation) on the request_value field 1226 of the request node 1220, replacing the expected zero with one. If the conditional synchronization primitive instruction succeeds, that means no thread has fulfilled the request. The request may be marked as being timed out and the mutex may be unlocked and the remove operation returns FALSE.

If the CAS on the request_value field fails, another thread was able to successfully perform an add operation that fulfilled the request. The add operation carries on as if the add operation was signaled by the fulfilling thread.

If the wait operation returns because of the condition variable being signaled by a thread that has fulfilled the request by performing an add operation, the requesting thread unlocks the mutex, performs a test-and-set instruction on the done field 928, and goes on to assign the output variable the contents of the value field 931 contained in the data node 930 addressed by the request_value field 926. The data node 930 is returned to the memory allocator and the operation returns TRUE.

In some embodiments, although the thread that creates the request node will block on a condition variable if the request is not immediately fulfilled, no other thread blocks as a result. If some other thread adding a node before this one performs the conditional synchronization primitive instruction to add the request, this thread starts the operation over. Immediately after the conditional synchronization primitive instruction, any other thread can add another node.

Some embodiments of the present invention include a remove operation that locks the requesting thread's mutex while checking the request node's request_value field and waiting on the condition variable, and that the fulfilling thread locks the requesting thread's mutex while signaling the condition variable. In accordance with at least one embodiment, a thread pause and resume may not be adequate due to the following possible ordering of events: the requesting thread checks the request_value field and finds the request_value to be zero, a fulfilling thread then sets the request_value field to the address of the data node and signals the requesting thread to resume, then the requesting thread performs a pause. In this situation, the requesting thread was not paused when the resume was sent, so when it does execute the pause, it has no chance of ever being resumed. So, the check of the request_value field and the execution of the wait may be part of a critical section in the requesting thread. Fortunately, since the mutex and condition variable are unique to the requesting thread, the only potential contention is between the requesting thread and the thread attempting to fulfill the request as part of an add operation.

A lock-free memory allocator for allocating and deallocating nodes may also be used in one or more embodiments of the present invention. Without a lock-free memory allocator, whatever gains were created by having a lock-free queue are lost in the contention for memory allocation.

With slight variation, embodiments of the present invention can be used in different abstractions, including, but not limited to, synchronous queues (also known as synchronous channels). For example, according to one embodiment, instead of having add operations succeed regardless of whether there is a waiting thread, a request-like node is added to the queue to wait for some other thread to make a corresponding remove. This scheme would work for threads performing add operations just as the above described algorithm works for threads performing remove operations.

The use of hazard pointers in various embodiments of the algorithm can be optimized by the realization that the shared tail pointer is needed only in those cases where a node is added to the list, so the tail pointer can be read and assigned to a hazard pointer in only those cases. Also, the hazard pointer for the shared head pointer can be reused in those same cases, reducing the overall number of hazard pointers per thread to two, and thus reducing by a third the number hazard pointers that must be scanned.

Figure 13A:
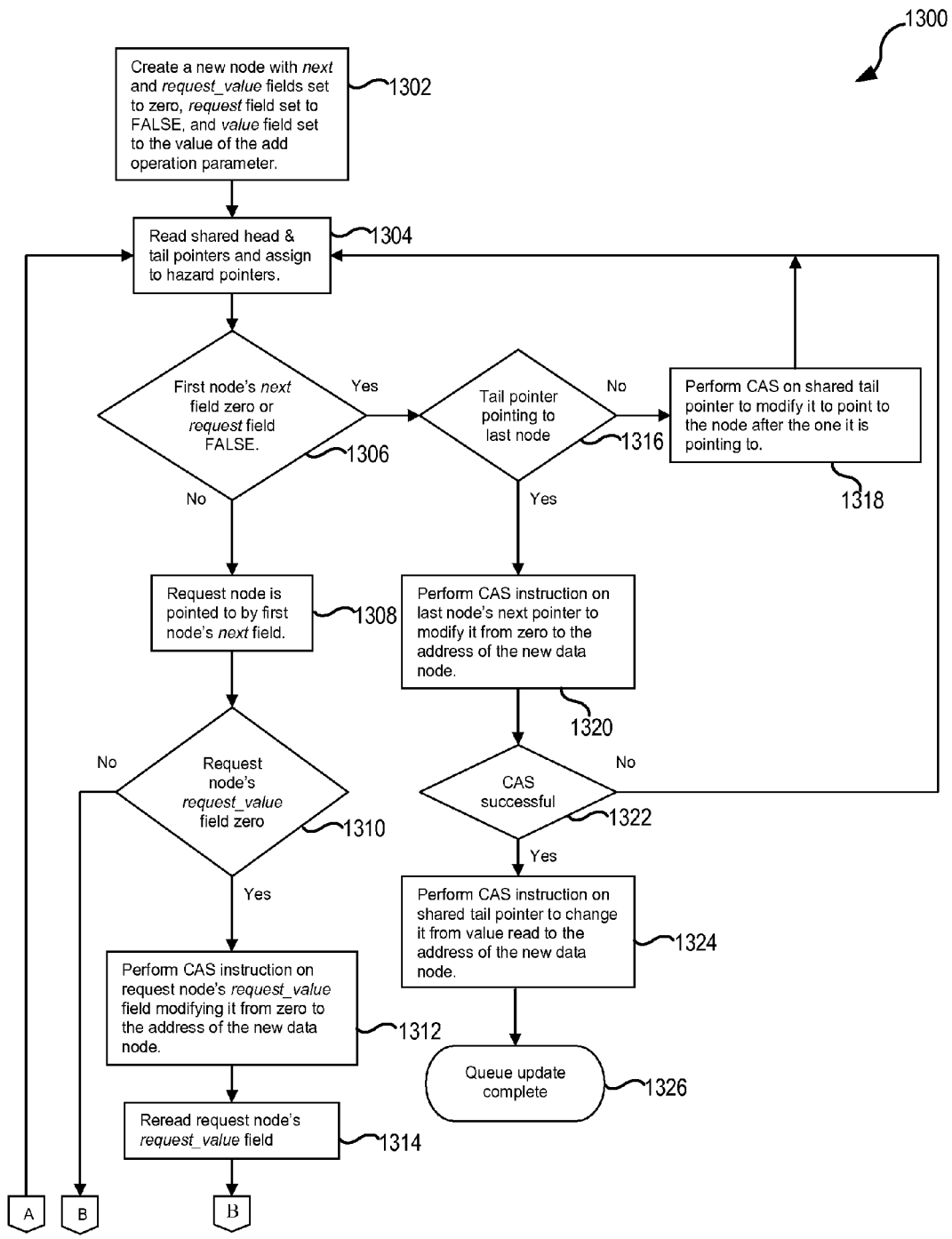
FIGS. 13A-13B illustrate exemplary operations in an add operation which may be used in accordance with some embodiments of the present invention.
Figure 13B:
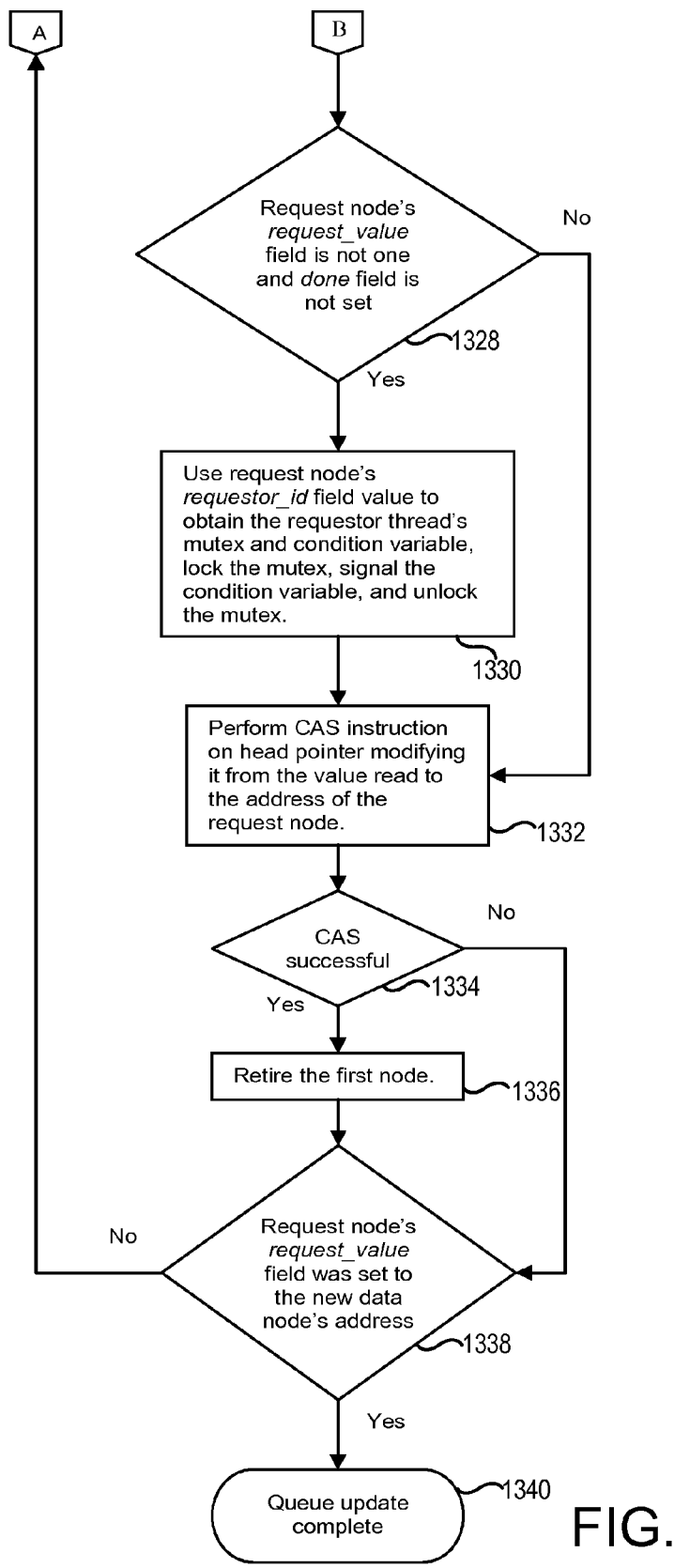

FIGS. 13A-13B illustrate exemplary operations 1300 in a non-blocking add operation which may be used in accordance with some embodiments of the present invention. According to various embodiments of the present invention, once an add operation is received by a shared object, such as a queue, create operation 1302 is performed. In one embodiment, create operation 1302 creates a new node with a next field and request_value field set to zero, the request field set to FALSE, and the value field set to the value of the add operation parameter. Read operation 1304 then reads the shared head and tail pointers. Read operation 1304 may also assign hazard pointers in some embodiments of the present invention.

Determination operation 1306 determines whether the first node in the queue, which is pointed to by the head pointer, has a next field with a value of zero or a request field with a FALSE indication. If the determination from operation 1306 is negative, then point operation 1308 determines that the first node's next field points to a request node. Determination operation 1310 then determines if the request node's request_value field is set to zero.

If a negative determination is made at operation 1310, then determination operation 1328 determines if the request node's request_value field is not one and the done field is not set. If determination operation 1328 determines the request node's request_value field is not one and the done field is not set, then the acquisition operation 1330 uses the request node's requestor-id field value to obtain the requester thread's mutex and condition variable, lock the mutex, signal the condition variable, and unlock the mutex.

Modify operation 1332 occurs after acquisition operation 1330, or if a negative determination was made at determination operation 1328. Modify operation 1332 performs a conditional synchronization operation on the head pointer which, if successful, will modify the head pointer from the value read to the address of the request node.

Determination operation 1334 determines whether the conditional synchronization operation was successful. If the conditional synchronization operation was successful, then retire operation 1336 retires the first node. Then, determination operation 1338 determines if the request node's request_value field was set to the new data node's address. Determination operation 1338 also occurs if the conditional synchronization was not successful.

If determination operation 1338 determines that the request_value field was set to the new data node's address, the queue update is complete as indicated by completion block 1340. If determination operation 1338 determines that the request_value field was not set to the new data node's address, then the operation returns to Read operation 1304.

If a positive determination is made at operation 1310 that the request node's request_value field is zero, then a conditional synchronization instruction operation 1312 performs the conditional synchronization instruction, such as a CAS, on the request node's request_value field modifying the field from zero to the address of the new data node. Read operation 1314 then rereads the request node's request_value field. This is then followed by determination operation 1328, which determines if the request node's request_value field is not one and the done field is not set as was previously described.

If the determination from determination operation 1306 returns a positive indication that the first node's next field is zero or the first node's request field is false, the pointing determination operation 1316 determines whether the tail pointer is pointing to the last node. If the tail pointer is not pointing to the last node, then a conditional synchronization operation 1318 performs a conditional synchronization instruction on the shared tail pointer to modify the tail pointer to point to the node after the one the tail node is pointing to and is then followed by read operation 1304. If the tail pointer is pointing to the last node, then conditional synchronization operation 1320 performs a conditional synchronization instruction on the last node's next pointer to modify the next pointer from zero to the address of the new data node.

Success determination operation 1322 determines if the conditional synchronization instruction performed by conditional synchronization operation 1320 was successful. If the conditional synchronization instruction was not successful, then control reverts to read operation 1304. If the conditional synchronization instruction was successful, then conditional synchronization operation 1324 performs a conditional synchronization instruction on the shared tail pointer to change the value from the value read to the address of the new data node. As indicated by completion block 1326, the operation is then complete.

Figure 14A:
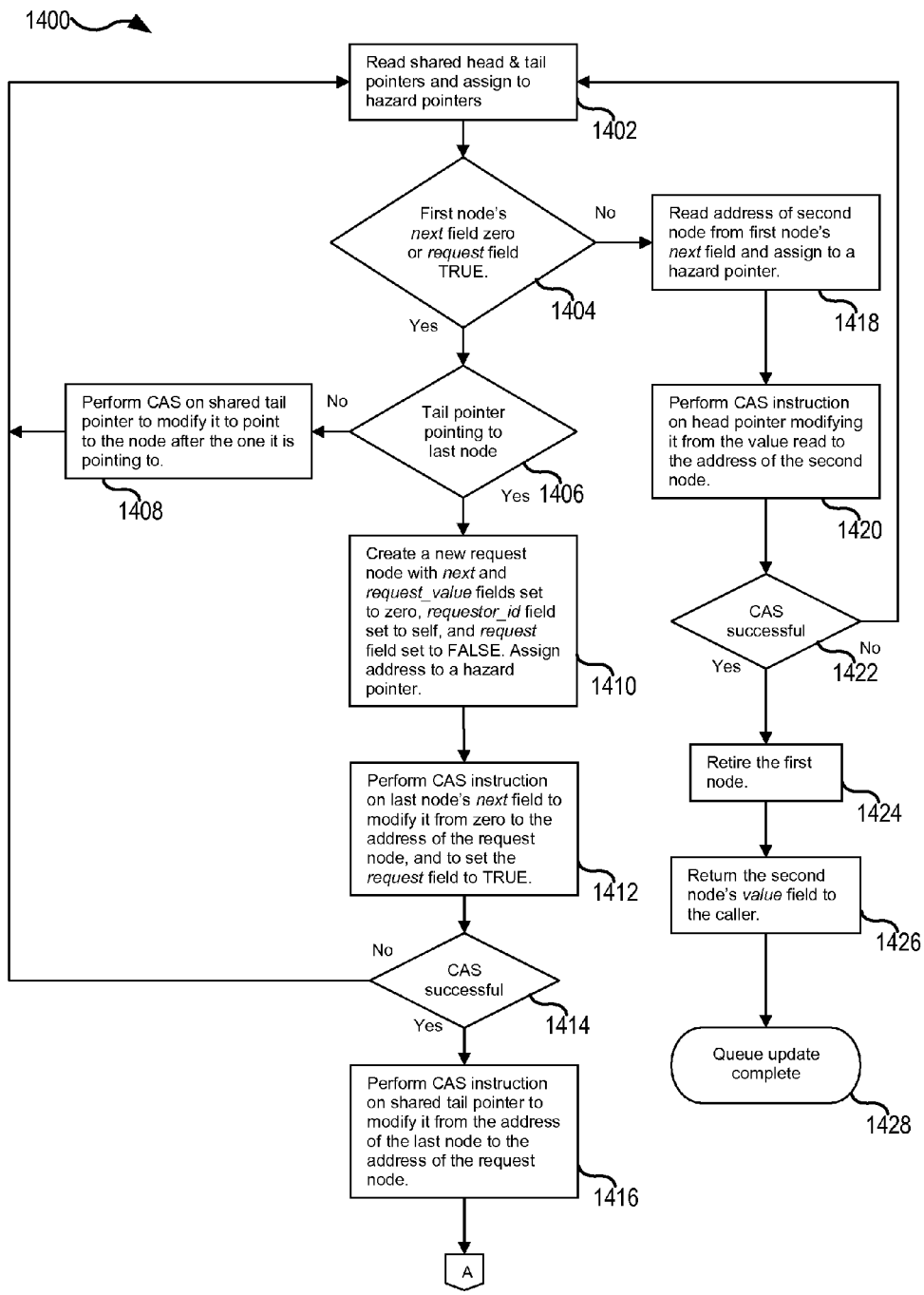
FIGS. 14A-14C illustrate exemplary operations in a remove operation which may be used in accordance with various embodiments of the present invention.
Figure 14B:
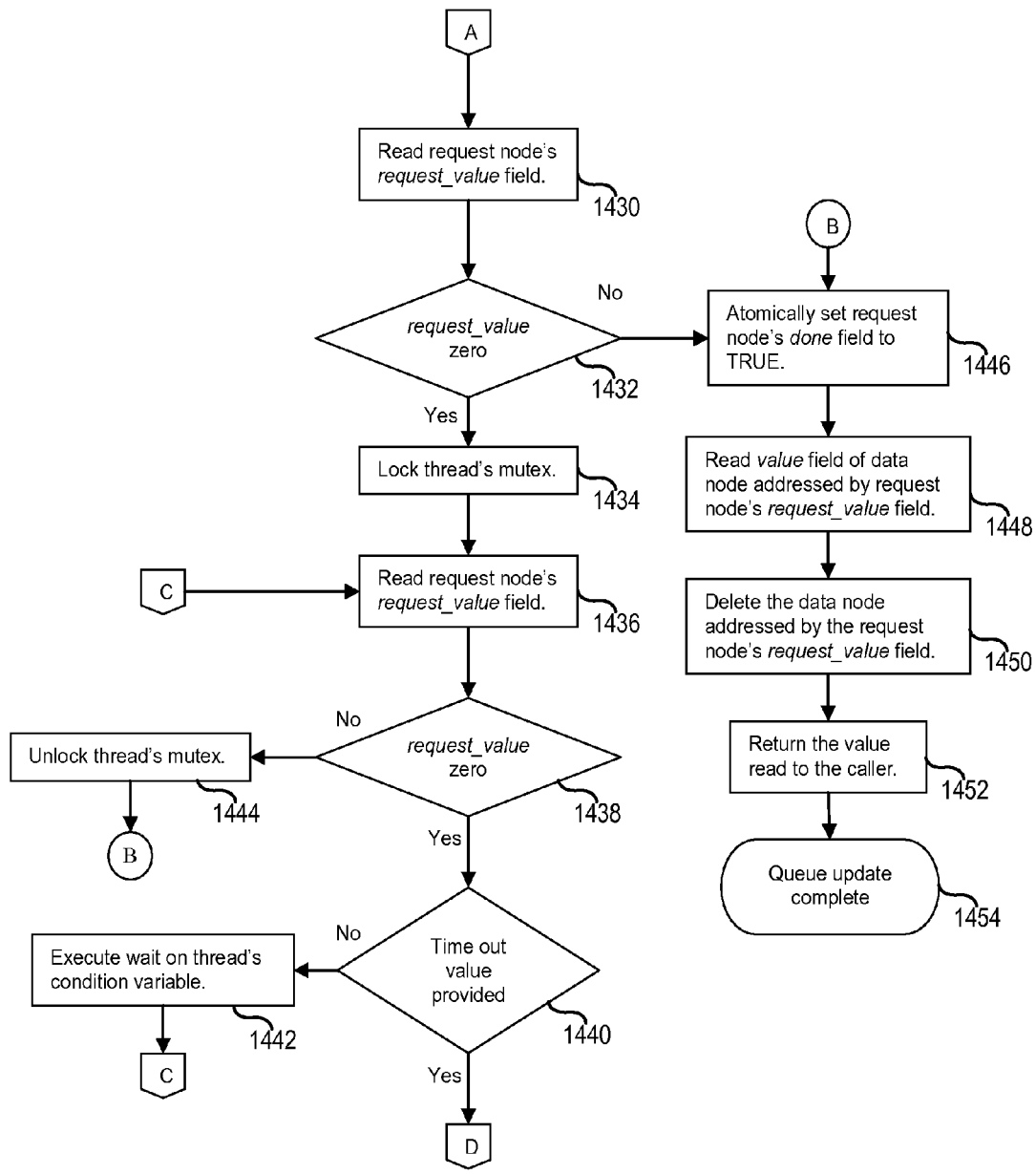
Figure 14C:
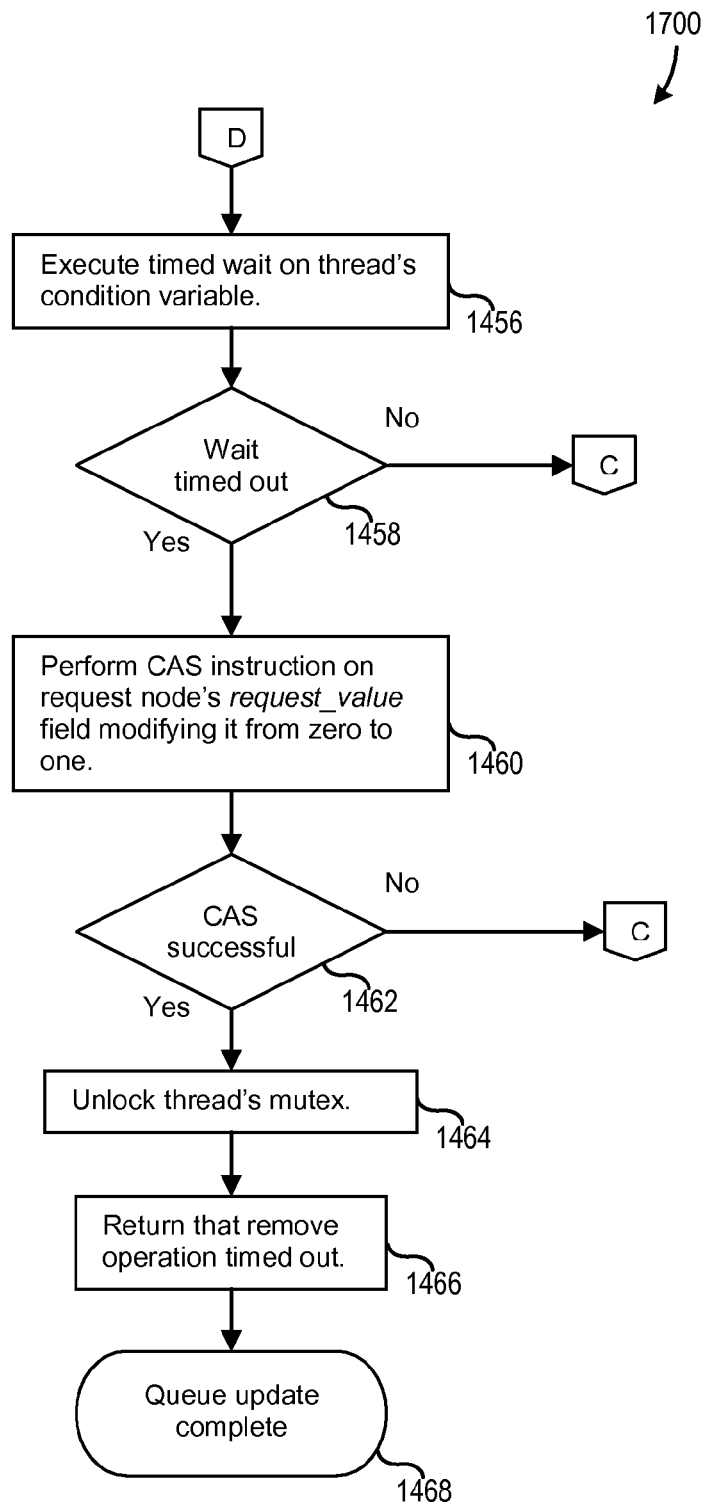

FIGS. 14A-14C illustrate exemplary operations 1400 in a non-blocking remove operation that may be used in accordance with various embodiments of the present invention. According to various embodiments of the present invention, a remove operation may end with one of three results which include the following: 1) return a value from a data node that was already in the queue; 2) return a value from a data node provided to fulfill a request; and 3) return no value after timing out while waiting. Consequently, three corresponding termination points, termination points 1428, 1454, and 1468, are illustrated in FIGS. 14A-14C.

According to various embodiments, a remove operation may take one or more input parameters. Once the remove operation is received, read operation 1402 reads the shared head pointer and tail pointer and may assign these values to hazard pointers. Determination operation 1404 uses the head pointer value read from read operation 1402 to determine if the first node's next field is zero or the request field of the first node is TRUE.

If determination operation 1404 makes a positive determination, then determination operation 1406 determines if the tail pointer is pointing to the last node. If not, the conditional synchronization operation 1408 uses a conditional synchronization primitive on the shared tail pointer to modify the shared tail pointer to point to the node after the node to which the shared tail pointer is currently pointing. Once conditional synchronization operation 1408 has finished, control reverts to read operation 1402. If the tail pointer is pointing to the last node, the create operation 1410 creates a new request node with a next and a request_value field both set to zero, a requestor_id field set to identify the thread executing the remove operation, and a request field set to FALSE. In some embodiments, create operation 1410 will also assign the address of the new request node to a hazard pointer.

Then, conditional synchronization operation 1412 uses a conditional synchronization operation on the last node's next field to possibly modify the field from zero to the address of the request node and to set the request field to TRUE. Determination operation 1414 determines if the conditional synchronization operation 1412 was successful. If the conditional synchronization operation 1412 was not successful, then read operation 1402 is performed again. If the conditional synchronization operation 1412 was successful, the conditional synchronization operation 1416 uses a conditional synchronization instruction on the shared tail pointer to modify the tail pointer from the address of the last node to the address of the request node.

Read operation 1430, then reads the request node's request_value field. Determination operation 1432 determines if the value read from the request_value field in read operation 1430 is zero. If the request_value is zero, then lock operation 1434 locks the thread's mutex. Read operation 1436 then rereads the request node's request_value field. Determination operation 1438 determines if the value read from the request_value field in read operation 1436 is zero. If request_value is zero, then time out determination operation 1440 determines if a time out value was provided as a parameter in the remove operation's arguments. If a time out parameter was not provided, then wait operation 1442 executes the wait operation on the thread's condition variable. The thread performing the remove operation waits until a thread performing an add instruction, after having set the request node's request_value field to point to a data node, signals the remove thread's condition variable. That terminates the wait for the thread executing the remove operation. After the wait is over, read operation 1436 is performed.

If a time out parameter was provided, the timed wait operation 1456 performs a timed wait on the thread's condition variable. Determination operation 1458 determines if the wait has timed out. If the wait has not timed out, i.e. the condition variable was signaled by a thread performing an add operation before the timeout limit passed, the read operation 1436 is performed. If the wait has timed out, the conditional synchronization operation 1460 performs a conditional synchronization on the request node's request_value field modifying the field from zero to one. Determination operation 1462 determines if the conditional synchronization operation 1460 was successful. If conditional synchronization operation 1460 was not successful, then read operation 1436 is performed. If conditional synchronization operation 1460 was successful, the unlock operation 1464 unlocks the thread's mutex. Return operation 1466 then returns an indicator indicating that the remove operation has timed out and the queue update is complete as indicated by block 1468.

If determination operation 1438 determines the request value read from the request_value field in read operation 1436 is not zero, then unlock operation 1444 unlocks the thread's mutex. Then, set operation 1446 uses a test and set instruction to atomically set the request node's done field to TRUE.

After the node's done field is set to TRUE, read operation 1448 reads the value field of the data node that was addressed by the request node's request_value field. The data node addressed by the request node's request_value field is deleted by deletion operation 1450. The value read by read operation 1448 is returned to the caller (i.e., the consumer thread) by return operation 1452. The remove operation is now complete as indicated by block 1454.

If the value read from the request_value field in read operation 1430 is not zero, then set operation 1446 uses a test and set instruction to atomically set the request node's done field to TRUE and the operation continues as previously described.

If determination operation 1404 makes a determination that the first node's next field is not zero and the request field is not TRUE, the read operation 1418 is performed. Read operation 1418 reads the address of the second node from the first node's next field and may assign the address to a hazard pointer. Once this is completed, conditional synchronization operation 1420 uses a conditional synchronization primitive instruction on the head pointer to attempt to modify the head pointer from the value read in read operation 1402 to the address of the second node.

Determination operation 1422 determines if the conditional synchronization operation 1420 was successful. If the operation was not successful, then read operation 1402 is performed. If the operation was successful, retire operation 1424 retires the first node. The second node's value field is returned to the caller by return operation 1426, which completes the call as indicated by block 1428.

Exemplary Computer System Overview

Figure 15:
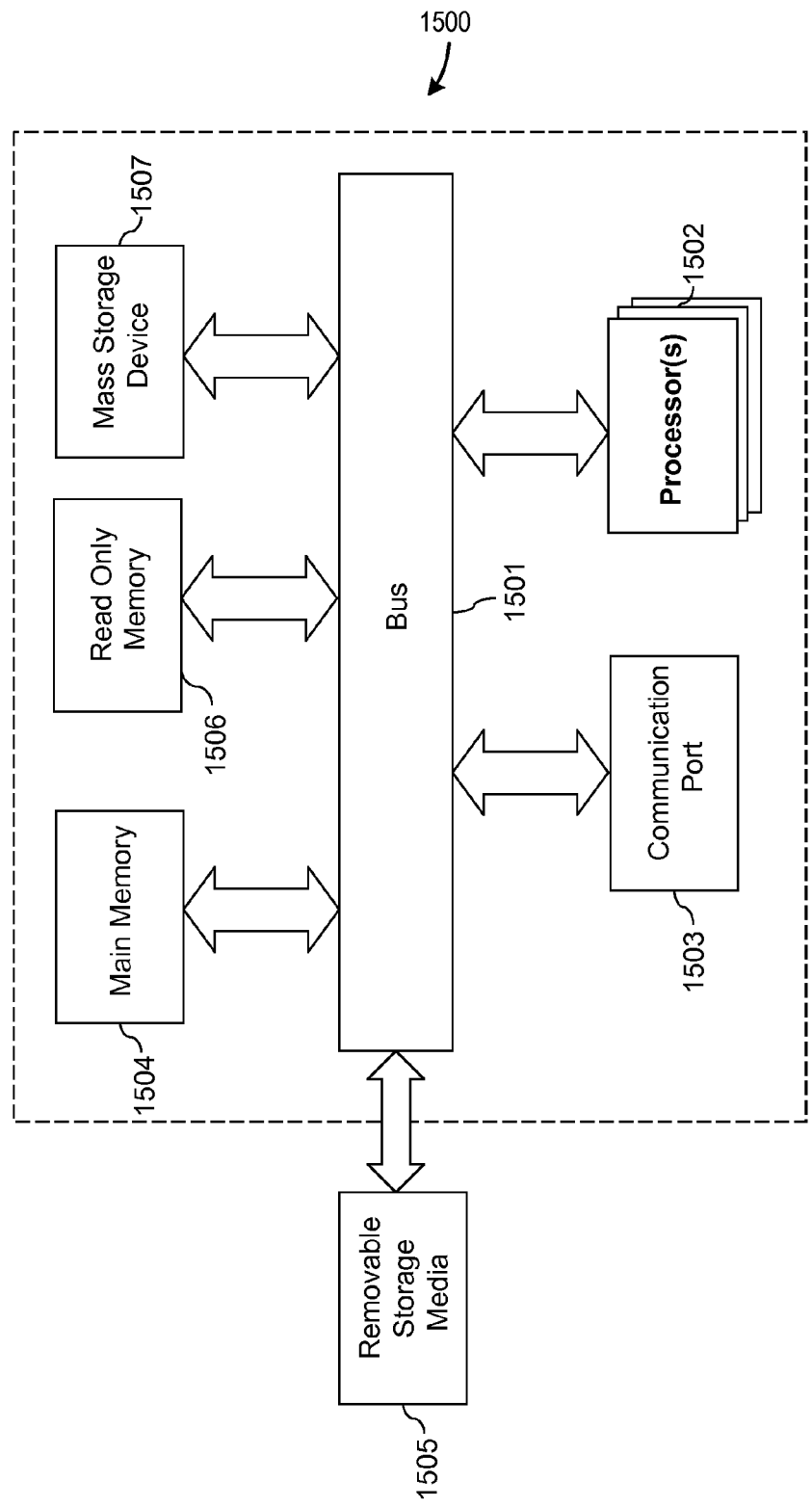
FIG. 15 illustrates an example of a computer system with which embodiments of the present invention may be utilized.

Embodiments of the present invention include various steps that may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 15 is an example of a computer system 1500 with which embodiments of the present invention may be utilized. According to the present example, the computer system includes a bus 1501, at least one processor 1502, at least one communication port 1503, a main memory 1504, a removable storage media 1505, a read only memory 1506, and a mass storage 1507.

Processor(s) 1502 can be any known processor, such as, but not limited to, an Intel® Itanium® or Itanium 2® processor(s), AMD® Opteron® or Athlon MP® processor(s), Sun Microsystems UltraSPARC line of processors, or Motorola® lines of processors. Communication port(s) 1503 can be any of an RS-232 port for use with a modem based dialup connection, a 10/100 Ethernet port, or a Gigabit port using copper or fiber. Communication port(s) 1503 may be chosen depending on a network such a Local Area Network (LAN), Wide Area Network (WAN), or any network to which the computer system 1500 connects.

Main memory 1504 can be Random Access Memory (RAM), or any other dynamic storage device(s) commonly known in the art. Read only memory 1506 can be any static storage device(s) such as Programmable Read Only Memory (PROM) chips for storing static information such as instructions for processor 1502.

Mass storage 1507 can be used to store information and instructions. For example, hard disks such as the Adaptec® family of SCSI drives, an optical disc, an array of disks such as RAID, such as the Adaptec family of RAID drives, or any other mass storage devices may be used.

Bus 1501 communicatively couples processor(s) 1502 with the other memory, storage and communication blocks. Bus 1501 can be a PCI/PCI-X or SCSI based system bus depending on the storage devices used. Bus 1501 can also represent a processor architecture-specific bus hierarchy that attaches to the aforementioned standard buses.

Removable storage media 1505 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM) or flash memory devices.

The components described above are meant to exemplify some types of possibilities. In no way should the aforementioned examples limit the scope of the invention, as they are only exemplary embodiments.

In conclusion, the present invention provides novel systems, methods and arrangements for operating lock-free dual queues with conditional synchronization and time-outs. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system comprising:
a memory logically partitioned into one or more memory areas, each memory area configured to store a node including a next field referring to a logically subsequent node, wherein one node stored in the one or more memory areas is a first node and one node stored in the one or more memory areas is a last node, and wherein at least one node is accessible by a consumer thread, and the next field of the last node is set to an initial value, wherein each node further including a request field including an indicator indicating whether the logically subsequent node is functioning as a request node;
a microprocessor executing one or more threads to access the last node on the memory and add an additional node, wherein a conditional synchronization primitive updates the next field of the last node to point to the additional node if the conditional synchronization primitive, operative on the last node, determines that the next field in the last node has not been modified and remains set to an initial value.

2. The system of claim 1, wherein each node further includes a next field initialized to zero and determining that the next field in the last node has not been modified includes making a determination whether the next field in the last node is zero.

3. The system of claim 1, wherein each node further includes:
a requestor identification field indicating a consumer thread.

4. The system of claim 1, wherein each node further includes one or more fields selected from a group consisting of a request value field, a value field, and a done field.

5. The system of claim 1, wherein the first node is a dummy node containing no data and pointing to a subsequent node if the queue is not empty.

6. The system of claim 1, wherein the memory further includes a head pointer pointing to the first node and a tail pointer pointing to the last node.

7. The system of claim 1, wherein the memory is a data structure that is classified as empty if a head pointer and a tail pointer stored in the memory both refer to the same node.

8. The system of claim 1, wherein the conditional synchronization primitive is a compare and swap function.

9. The system of claim 1, wherein a thread updates a tail pointer and a head pointer to point to a first node when the queue is initialized.

10. A computer-readable storage medium that comprises a physical medium and contains a set of instructions capable of causing one or more processors to manage a dual queue that can enter a data state, an empty state, and a request state, the instructions to cause the dual queue to:
initially enter the empty state;
in response to receiving an add operation while in the empty state, add specified data to the queue and transitioning to the data state;
in response to receiving a remove operation while in the empty state, add a request to the queue and transitioning to the request state;
in response to receiving an add operation while in the data state, add specified data to the queue and remaining in the data state;
in response to receiving a remove operation while in the data state, remove data from the queue and transition to the empty state if no more data exists on the queue after removing the data from the queue, or remain in the data state if data exists on the queue after removing the data from the queue;
in response to receiving a remove instruction while in the request state, add a request to the queue and remain in the request state; and
in response to receiving an add operation while in the request state, fulfill the request with data specified in the add operation and transition to the empty state if no additional requests exist on the queue after removing the request from the queue, or remain in the requests state if one or more additional requests exist on the queue after removing the request from the queue.

* * * * *